(12) United States Patent
Ohno

(10) Patent No.: US 8,014,077 B2
(45) Date of Patent: Sep. 6, 2011

(54) VARIABLE POWER OPTICAL SYSTEM AND IMAGING DEVICE

(75) Inventor: Kazunori Ohno, Saitama (JP)

(73) Assignee: Fujinon Corporation, Saitama (JP)

( * ) Notice: Subject to any disclaimer, the term of this patent is extended or adjusted under 35 U.S.C. 154(b) by 68 days.

(21) Appl. No.: 12/647,245

(22) Filed: Dec. 24, 2009

(65) Prior Publication Data
US 2010/0165478 A1 Jul. 1, 2010

(30) Foreign Application Priority Data

Dec. 26, 2008 (JP) .............................. P2008-332068
Dec. 17, 2009 (JP) .............................. P2009-286246

(51) Int. Cl.
*G02B 15/14* (2006.01)
(52) U.S. Cl. ........................ 359/682; 359/680
(58) Field of Classification Search ............ 359/680, 359/682, 685
See application file for complete search history.

(56) References Cited

U.S. PATENT DOCUMENTS

| | | | |
|---|---|---|---|
| 5,552,937 A * | 9/1996 | Ono et al. ................ | 359/691 |
| 7,167,318 B2 | 1/2007 | Tomioka | |
| 7,787,191 B2 * | 8/2010 | Wang ......................... | 359/682 |
| 7,907,351 B2 * | 3/2011 | Tomioka ...................... | 359/691 |

FOREIGN PATENT DOCUMENTS

| | | |
|---|---|---|
| JP | 1-303409 A | 12/1989 |
| JP | 2001-281544 A | 10/2001 |
| JP | 2006-251437 A | 9/2006 |
| JP | 2008-112000 A | 5/2008 |

* cited by examiner

*Primary Examiner* — David N Spector
(74) *Attorney, Agent, or Firm* — Birch, Stewart, Kolasch & Birch, LLP

(57) ABSTRACT

On condition that a first lens group adopts at least one plastic lens; a second lens group adopts at least any two adjacent plastic lenses; the first lens group monotonously moves from an object side to an image plane side in a zooming; the second lens group monotonously moves from the image plane side to the object side; wherein fw/fpi represents a ratio of refractive power of the entire system achieved at a wide angle end to refractive power of the respective lenses; P1 represents a total of fw/fpi of the plastic lenses of the first lens group; and P2 represents a total of fw/fpi of the plastic lenses of the second lens group, the following conditional expressions $-0.22<P1<-0.01$ and $-0.15<P2<-0.03$, are both fulfilled.

5 Claims, 17 Drawing Sheets

EXAMPLE 1

FIG. 1                              EXAMPLE 1

FIG. 3
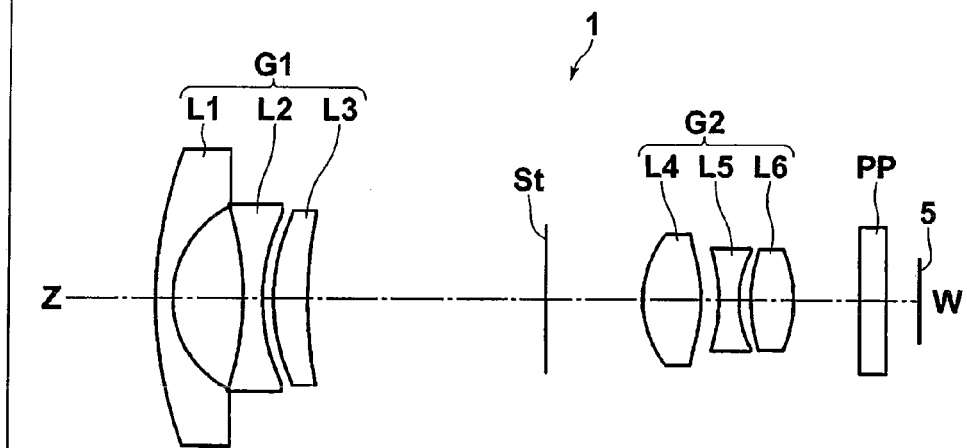
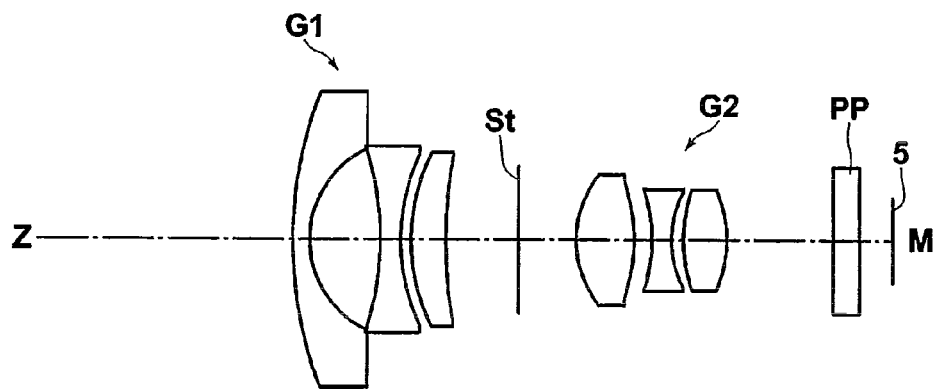
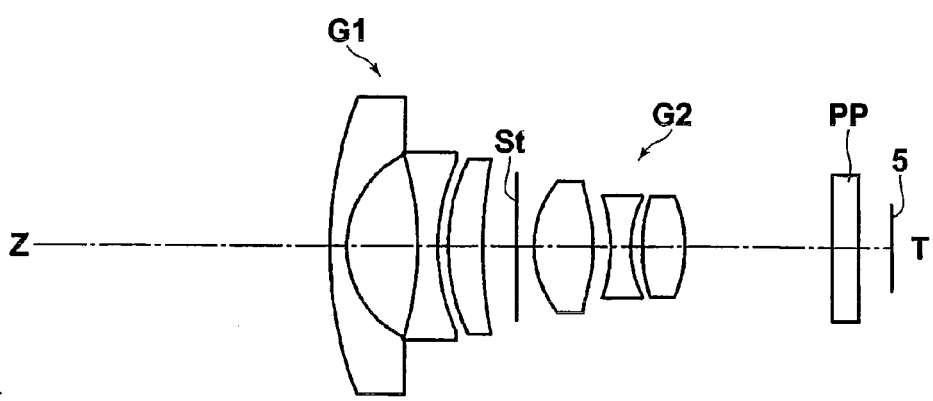

FIG. 7 EXAMPLE 7

FIG. 8 EXAMPLE 8

VARIABLE POWER OPTICAL SYSTEM AND IMAGING DEVICE

The present application claims priority from Japanese Patent Application No. 2008-332068 filed on Dec. 26, 2008 and Japanese Patent Application No. 2009-286246 filed on Dec. 17, 2009, the entire content of which is incorporated herein by reference.

BACKGROUND OF INVENTION

1. Field of the Invention

The present invention relates to a viable power optical system used in an onboard camera, a surveillance camera using an imaging element, such as a CCD and a CMOS, and, more particularly, to a variable power optical system suitable for use in a surveillance camera.

2. Description of the Related Art

A variable power optical system employed in a varifocal lens for use with a surveillance camera provides convenience which allows a user to set a focal length and a distance to a subject according to a user environment, and hence a market for the variable power optical system has recently undergone particular expansion as an optical system for use with a surveillance camera. Meanwhile, a demand for development of a low-cost, high-performance lens system is also escalating.

A surveillance camera primarily intended for surveillance use is required to be able to cover a wide angular field of view to a standard field angle and withstand indoor or outdoor use. Therefore, a negative-positive two-group zoom lens that has a comparatively simple structure and that conforms to conditions to a certain extent is heavily used. In addition to having an advantage of simple structure, the negative-positive two-group zoom lens has other advantages. Namely, a negative group is positioned in front of a positive group, whereby a wide field angle is acquired; and a long back focal length can be acquired for a short focal length. Therefore, the negative-positive two-group zoom lens is widely used.

From the viewpoint of the above-mentioned intended use, lens specifications of the variable power optical system require a large diameter fast lens system including an ultra wide angle field. Therefore, in order to maintain a certain degree of performance, a related-art spherical lens system requires a greater number of constituent lenses, and the lens is prone to being greater in diameter and cost.

Accordingly, in order to curtail cost by means of the current technology, it is necessary to reduce the number of constituent lenses and heavily use a plastic material that is inexpensive in terms of a material cost.

Variable power optical systems described in; for instance, JP-A-2008-112000, JP-A-01-303409, JP-A-2001-281544, and JP-A-2006-251437 have already been known as a negative-positive two-group zoom variable power optical system including plastic lenses, such as those mentioned above.

However, many technical drawbacks are encountered when plastic lenses are utilized in the field of a surveillance camera. The drawbacks include the followings. Namely, it is necessary to make a plastic lens less prone to a change in imaging position or performance, which would be caused by environmental changes; in particular, a temperature change, a humidity change, and the like. Moreover, an optical plastic material is very restrictive and has a degree of freedom that is smaller than that of a glass material, which poses a restriction on the design of a lens. Introduction of an aspherical surface technique is indispensable for attempting to achieve higher performance while the number of lenses is reduced.

Moreover, in the field of a surveillance camera, it is required to achieve lens specifications by means of which high speed achieved at F/1.4 is realized while an ultra wide area of 100 degrees or more is covered. However, it has been difficult to implement a variable power optical system having such high specifications by means of the plastic lenses described in JP-A-2008-112000, JP-A-01-303409, and JP-A-2001-281544. Further, although the plastic lens described in JP-A-2006-251437 corresponding to US 2006/203355 fulfill the target high specifications, the lenses include glass aspherical lenses that are costly to manufacture and cannot be said to be less expensive.

A digital camera and a movie camera have a built-in automatic focusing function and therefore can automatically make corrections to positional displacements of an image. However, in the field of a surveillance camera, it is preferable to compensate for positional displacement of an image by use of only a lens system so that the lens system can be attached to a camera not having an automatic focusing function.

SUMMARY OF INVENTION

The present invention has been conceived in view of the circumstance and aims at providing a low-cost variable power optical system satisfying high specifications as well as an imaging device having the variable power optical system.

A plastic optical material is greater than a glass material by one order of magnitude in terms of a linear expansion coefficient. Since the plastic optical material is greater than the glass material in terms of deformation and a change in refractive index induced by an environmental change, such as a temperature change and a humidity change, a change in an imaging position of a lens system and degradation of imaging performance of the lens system are induced. Therefore, the plastic optical material has hitherto been considered to be susceptible to an environmental change. However, production cost of the plastic optical material will come to about one-third of production cost of a glass spherical lens if the quantity of production of the plastic optical material is large. Thus, the plastic optical material is indispensable for curtailing the cost of the lens system. Although the plastic optical material has hitherto been used for optical system fulfilling comparatively-low specifications when a priority is given to cost, introduction of the plastic optical material to optical systems fulfilling high specifications becomes indispensable as a result of intensification of price competition.

A plastic optical material has factors for degrading imaging performance, such as a time-varying change in refractive index due to moisture absorbency and unevenness in polarization and refractive index due to molding strain. Hence, the plastic optical material has hitherto poses a problem in production. However, by virtue of technical improvements, it has nowadays come to be able to select a material from a material whose moisture absorbency is minimized and a material involving few distortion. Accordingly, remaining problems are deformation and a change in refractive index induced by a temperature change. Both of the problems can be said to be dependent on a linear expansion coefficient of a material. Further, a numerical change induced by a temperature can be quantified. It has come to be able to provide comprehensive consideration to a plastic optical material allowing for a positional change in a plastic lens frame material, a change in refractive index of a glass material whose imaging plane undergoes a less positional change in the direction of an optical axis as compared with the amount of positional change in the lens in the direction of the optical axis (hereinafter described as a "rate of contribution to fluctuation"), and the like.

In such a development environment, a plastic material is actively employed, and a change characteristic of the plastic material is taken into optical design. As a consequence, claim conditions, such as those provided below, are found, and a variable power optical system fulfilling objective specifications can have been conceived.

In a variable power optical system comprising a first lens group having negative refractive power and a second lens group having positive refractive power in order from an object side, the first lens group has, in order from the object side, a negative lens whose convex surface is oriented toward the object side, a biconcave lens, and a positive lens, at least one of which is a plastic lens; the second lens group has, in order from the object side, a biconvex lens, a biconcave lens, and a positive lens, any two adjacent lenses of which are plastic lenses; in a direction from a wide angle side to a telephoto side, the first lens group monotonously moves from the object side toward an image plane side and the second lens group monotonously moves from the image plane side toward the object side; and, on condition that, when a sequence of respective plastic lenses in each of the lens groups is taken in order from the object side as the $i^{th}$, the focal length of each of the lenses is fpi (i=1, 2, . . . n; "n" is a natural number); that focal lengths of the respective lenses achieved at the wide angle end of the entire system are taken as fw; that a ratio between refractive power of the entire system achieved at the wide angle end and refractive power of each of the lenses achieved at the wide angle end is taken as fw/fpi; that a total of fw/fpi pertaining to the plastic lenses of the first lens group is taken as P1 (P1=Σ(fw/fpi): $1 \leq i \leq n1$; n1 is a total number of plastic lenses in the first lens group); and that a total of fw/fpi pertaining to the plastic lenses of the second lens group is taken as P2 (P2=Σ(fw/fpi): $1 \leq i \leq n2$: n2 is a total number of plastic lenses in the second lens group), conditional expressions (1) and (2) are fulfilled. Hence, a low-cost variable power optical system fulfilling high specifications can be implemented.

Since an imaging device of the present invention has the variable power optical system of the present invention, a high-precision video can be produced at a wide angle.

BRIEF DESCRIPTION OF THE DRAWINGS

FIG. 3 is a cross-sectional view showing a lens configuration of an imaging lens of Example 3 of the present invention;

DESCRIPTION OF EXEMPLARY EMBODIMENTS

An embodiment of the present invention is described in detail by reference to the drawings hereinbelow.

Figure 1:
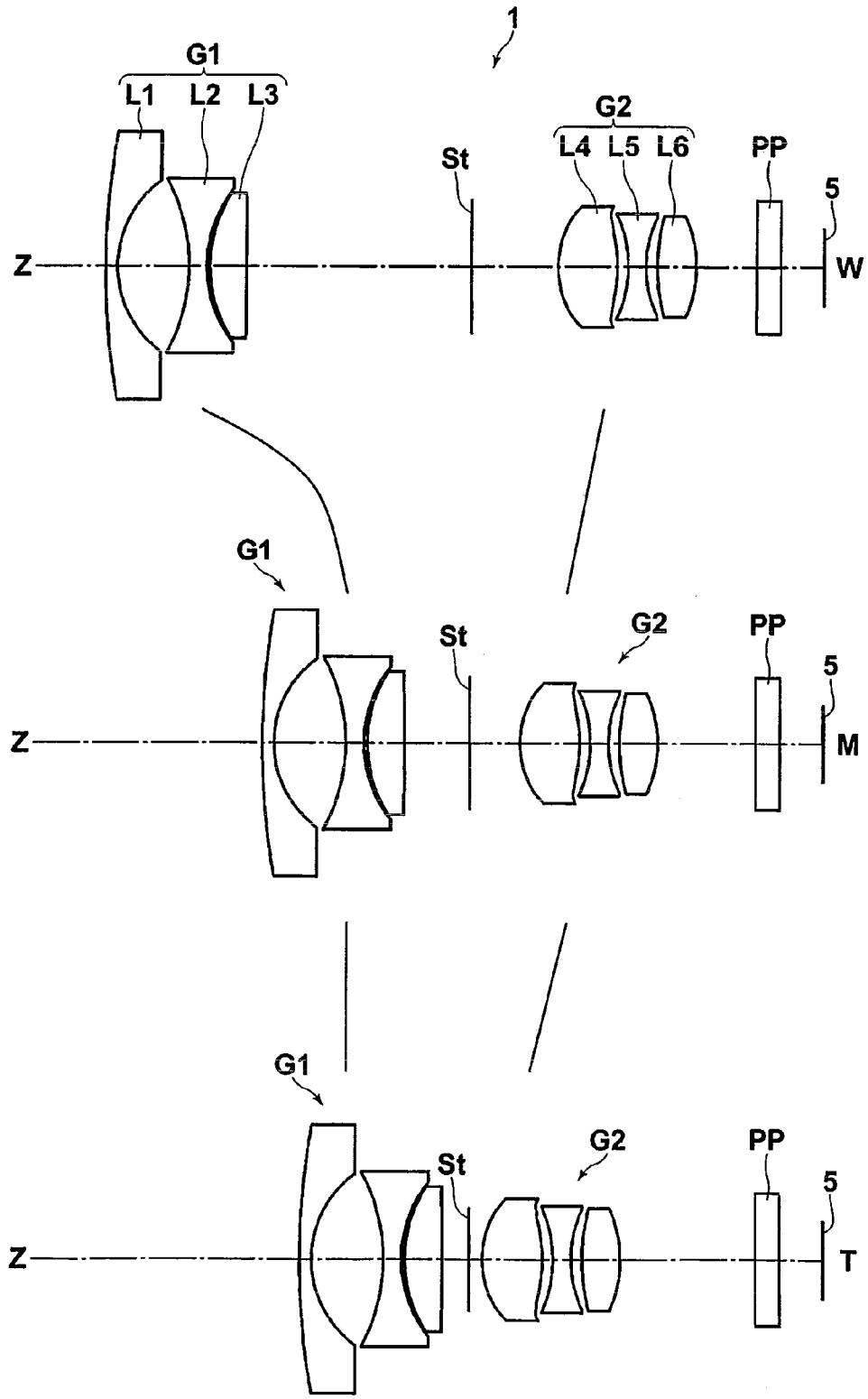
FIG. 1 is a cross-sectional view showing a lens configuration of an imaging lens of Example 1 of the present invention.

FIG. 1 is a cross-sectional view showing the configuration of a variable power optical system of an embodiment of the present invention and corresponds to a variable power optical system of Example 1 to be described later.

A variable power optical system 1 of the present embodiment of the present invention has, in order from an object side, a first lens group G1 having negative refractive power, an aperture stop St, and a second lens group G2 having positive refractive power along an optical axis Z. The first lens group G1 is made up of, in order from the object side, a negative lens L1 whose convex surface is oriented toward the object side, a biconcave lens L2, and a positive lens L3. The second lens group G2 is made up of, in order from the object side, a biconvex lens L4, a biconcave lens L5, and a positive lens L6.

The aperture stop St shown in FIG. 1 does not necessarily represent a size and a shape but shows a position on the optical axis Z. In FIG. 1, a left side corresponds to an object side, and a right side corresponds to an image side. In FIG. 1, a lens arrangement achieved at a wide angle end in a state of infinite focusing is provided at a top position; a lens arrangement achieved at an intermediate field angle and at infinite focusing is provided at an intermediate position; and a lens arrangement achieved at a telephoto end and at infinite focusing is provided at a bottom position. Rough paths of movements of the respective lens groups performed when power varies from a wide angle end to a telephone end are indicated by solid lines.

FIG. 1 illustrates an image plane by means of reference numeral 5. For instance, when the variable power optical system is applied to an imaging device, the optical system is arranged in such a way that an imaging plane of an imaging element comes to the image plane 5.

When the variable power optical system is applied to an imaging device, it is preferable that, according to the configuration of a camera to which the lenses are attached, a cover glass or various filters, such as a UV cutoff filter, an infrared-ray cutoff filter, and a low-pass filter, should be placed between a lens closest to an image side and an imaging plane. FIG. 1 shows an example in which a plane parallel optical member PP that is imaginary cover glass or an imaginary filter is interposed between the lens group closest to the image side and the image plane 5.

The variable power optical system 1 is at least one plastic lens of lenses constituting the first lens group G1. Any two adjacent lenses of lenses constituting the second lens group G2 are plastic lenses. In a direction from the wide angle side to the telephoto side, the first lens group monotonously moves from the object side toward the image plane side, and the second lens group monotonously moves from the image plane side to the object side.

On condition that, when the sequence of respective plastic lenses in each of the lens groups is taken in order from the object side as the $i^{th}$, the focal length of each of the lenses is fpi (i=1, 2, ... 6); that focal lengths of the respective lenses achieved at the wide angle end of the entire system are taken is fw; that a ratio between refractive power of the entire system achieved at the wide angle end and refractive power of each of the lenses achieved at the wide angle end is taken as fw/fpi; that a total of fw/fpi pertaining to the plastic lenses of the first lens group G1 is taken as P1 (P1=E (fw/fpi): $1 \leq i \leq 3$); and that a total of fw/fpi pertaining to the plastic lenses of the second lens group G2 is taken as P2 (P2=Σ(fw/fpi): $4 \leq i \leq 6$), conditional expressions (1) and (2) provided below are satisfied.

$$-0.22 < P1 < -0.01 \quad (1)$$

$$-0.15 < P2 < -0.03 \quad (2)$$

Since the optical system of the present invention is an optical system that varies power by mutually moving the first lens group G1 having negative refractive power and the second lens group G2 having positive refractive power. Therefore, a rate of contribution to fluctuations (hereinafter a "rate of fluctuation contribution") with reference to an imaging plane changes between the wide angle end and the telephoto end. According to the specifications pursued by the present invention, the first lens group G1 achieves about a 0.1-times rate of fluctuation contribution at the wide angle end; the second lens group G2 achieves about a 0.9-times rate of fluctuation contribution at the wide angle end; the first lens group G1 achieves about a 0.7-times rate of fluctuation contribution at the telephoto end; and the second lens group G2 achieves about a 0.3-times rate of fluctuation contribution at the telephoto end.

In a case where a plane of a solid-state imaging element is considered as a reference and where a plastic material leading to cost reduction is used for lens frames, the imaging position undergoes, for reasons of thermal expansion and contraction of plastic lens frames with respect to their reference positions in the respective groups, a change of about −0.03 mm at a wide angle end and a change of about −0.04 mm at a telephoto end induced by a temperature increase of +35° C. Therefore, when the plastic lenses are introduced into the optical system, a correction must be made so as to cancel the changes in consideration of the expansion and contraction mentioned above.

In the first lens group G1, two negative lenses and one positive lens are arranged in order from the object side. The reason for this is that negative distortion must excessively be caused in order to achieve an ultra wide angle of 100° or more at the wide angle end; that the degree of distribution freedom of refractive power of the two negative lenses is increased; and that fluctuations in the position of an imaging point induced by a temperature become easy to suppress. Forming from plastic only one positive lens in the first lens group G1 is not preferable because fluctuations in the position of an imaging point induced by a temperature become excessively larger. Forming all of the three lenses from a plastic material is also conceivable. However, since negative refractive power surpasses positive refractive power, fluctuations in the position of the imaging point caused by a temperature become greater in a negative direction, and hence it is impossible to adopt the idea of forming the three lenses from a plastic material. Accordingly, it is preferable to form only one negative lens from plastic or form a combination consisting of one positive lens and one negative lens from plastic.

Since the entirety of the second lens group G2 has positive refractive power, superior performance can be maintained over an entire screen, so long as the lens group is embodied as a triplet consisting of, in order from the object side, the positive lens L4, the negative lens L5, and the positive lens L6. The essential requirement is to select any two adjacent lenses of the triplet as plastic lenses. The reason why two adjacent lenses are selected is that a change in refractive index of a plastic material induced by a temperature is great and that closely adjacent plastic lenses cancel or minimize an aberration fluctuation, such as degradation of a spherical aberration. From the viewpoint of an effect of assuring performance and reducing the number of lenses, it is desirable that the second lens group G2 includes an aspherical lens. In this case, however, it is also important to embody a lens, which can be made of a plastic lens, as an aspherical lens in terms of cost reduction.

From the fact that the first lens group G1 monotonously moves toward the imaging plane side during variation of power from the wide angle end to the telephoto end, it is guaranteed that the rates of fluctuation contribution of the first and second lens groups G1 and G2 responsive to fluctuations in the position of an imaging point assume the same sign in a range of power variation and that a change in the position of the imaging point achieved at an intermediate range of power variation does not become equal to or greater than changes arising at both ends.

Conditional expression (1) specifies a total of refractive power of the plastic lenses in the first lens group G1. When refractive power falls short of the lower limit value of conditional expression (1), a value of fluctuation in the position of the imaging point at; particularly, the telephoto side, induced by a temperature becomes excessively larger in a negative direction. In contrast, when refractive power surpasses the upper limit, refractive power of the positive lens becomes excessively greater. Negative refractive power of remaining glass lenses becomes excessive, so that difficulty is encountered in compactly integrating corrections to the aberrations.

Conditional expression (2) specifies a total of refractive power of the plastic lenses of the second lens group G2. When the total value falls short of the lower limit of conditional expression (2), a value of fluctuation in the position of the imaging point induced by a temperature becomes excessively larger in a negative direction. The position of the imaging point deviates from a point on the plane of the imaging element toward the lens with an increase in temperature, thereby greatly deteriorating imaging performance. In contrast, when the total value surpasses the upper limit, imaging performance of the entire system is adversely affected, such as degradation of chromatic aberration and an increase in field tilt, because a relative value of negative refractive power in the second lens group G2 is small. When the total value is close to 0.0, the plastic lenses become resistant to a temperature change. However, when the total value exceeds +0.0, fluctuations in the position of the imaging point become greater in a positive direction, and a deviation of the imaging point becomes greater. Thus, performance is deteriorated when a use environment is subjected to high or low temperatures.

Therefore, as a result of adoption of a configuration, such as that mentioned above, a low-cost variable power optical system can be implemented while high specifications are satisfied.

On the assumption that a synthetic focal length of the first lens group is taken as fF and that a synthetic focal length of the second lens group is taken as fB, the variable power optical system 1 preferably satisfies conditional expression (3) provided below.

$$-1.30 < fB/fF < -1.10 \quad (3)$$

Conditional expression (3) is a conditional expression pertaining to distribution of refractive power of the first lens group G1 and the second lens group G2. When refractive power surpasses the upper limit, negative refractive power of the first lens group G1 becomes smaller, and an ultra wide angle of 100° or more is not achieved, and amounts of movement of the respective groups performed during variation of power become larger, thereby rendering the diameter of the lens system large. Thus, various problems arise. In contrast, when refractive power falls short of the lower limit, the negative focal length of the first lens group G1 becomes shorter. In order to assure the focal length of the entire system, amounts of movement of the second lens group G2 become much greater. The second lens group G2 moves far distant with respect to an aperture stop St that regulate the brightness of the image plane 5, which in turn renders the diameter of the second lens group G2 larger. Aberration fluctuations arising at the wide angle side and aberration fluctuations arising at the telephoto side become greater, thereby degrading imaging performance. Thus, problems arise.

Given that the focal length of the biconvex lens in the second lens group is taken as f4 and that a focal length of the positive lens is taken as f6, satisfying conditional expression (4) provided below is desirable.

$$0.90 < f6/f4 < 1.20 \quad (4)$$

Conditional expression (4) is a conditional expression pertaining to distribution of refractive power in the second lens group G2. When the second lens group G2 of the present invention conforms to specifications for a fast optical system of f/1.4, distribution of refractive power among the lenses in the group becomes important. In the second lens group G2 consisting of, in order from the object side, the biconvex lens L4, the biconcave lens L5, and the positive lens L6, the refractive power of the second lens group G2 is restricted by conditional expression (3). In such a situation, as long as the refractive power of the biconvex lens L4 is made larger, refractive power of the positive lens L6 is lessened. Therefore, an advantage is yielded in terms of off-axis performance. However, when refractive power surpasses the upper limit of conditional expression (4), the back focal length of the entire system becomes shorter, and a required amount of flange back focus of a lens barrel cannot be fulfilled. In order to avoid the problem, increasing; for instance, refractive power of the biconcave lens L5, is also conceivable. However, this affects chromatic aberration and hence is not preferable.

Conversely, as long as the refractive power of the biconvex lens L4 is reduced, the refractive power of the positive lens L6 becomes greater. When refractive power falls short of the lower limit of conditional expression (4), asymmetry of the arrangement of refractive power of the entire system centered on the aperture stop St is enhanced, thereby undesirably degrading off-axis aberrations, such as a field curvature and a coma aberration. It is also possible to make the positive lens L6 aspherical at this time. However, the positive lens intensively affects both the spherical aberration and the off-axis aberrations, which makes it difficult to maintain superior imaging performance over the entire screen.

EXAMPLES

Numerical examples of the variable power optical system of the present invention are now described.

Example 1

FIG. 1 shows cross sectional profiles of lenses in a variable power optical system of Example 1. Table 1 shows lens data pertaining to the variable power optical system of Example 1; Table 2 shows aspherical data; Table 3 shows various sets of data; and Table 4 shows data pertaining to temperature changes. Likewise, Tables 5 to 32 show lens data, aspherical data, various sets of data, temperature change data pertaining to variable power optical systems of Examples 2 to 8. Meanings of symbols in the tables are hereunder described by means of taking Example 1 as an example. The same also basically applies to the tables for Examples 2 through 8.

In relation to the lens data shown in Table 1, a surface number sequentially increases toward the image side while a surface of a constituent element closest to the object side is taken as the first surface, and on-axis surface spacing designates surface spacing between a surface of interest and the next surface along the optical axis Z. In relation the lens data, reference symbol Nd designates a refractive index of the $n^{th}$ (n=1, 2, 3, ...) optical element, which sequentially increases toward the image side while the lens closest to the object side is taken as the first, with respect to a D line (a wavelength of 587.6 nm); and reference symbol vd designates an Abbe number of the $n^{th}$ optical element with respect to the D line. The basic lens data also include the aperture stop St and the optical member PP. A field for a curvature radius of a surface corresponding to the aperture stop St is provided with a description of (diaphragm). A sign of a curvature radius of the basic lens data becomes positive when a convex is oriented toward the object side and becomes negative when the convex is oriented toward the image side.

In relation to the lens data provided in Table 1, D6 (variable), D7 (variable), and D13 (variable) are provided in respective surface spacing fields corresponding to spacing between the first lens group G1 and the aperture stop St, spacing between the aperture stop St and the second lens group G2, and spacing between the second lens group G2 and the optical member PP which are changed to vary power.

In relation to the lens data provided in Table 1, a surface number of an aspherical surface is provided with an asterisk, and a numeral of a paraxial curvature radius is provided as a curvature radius of an aspherical surface. In relation to aspherical data provided in Table 2, surface numbers assigned to aspherical surfaces and aspherical coefficients of the aspherical surfaces are shown. Aspherical coefficients are values of coefficients "K" and Am (m=4, 6, 8, 10, 12) in an aspherical expression represented by Equation (A) provided below.

$$X = C \cdot h^2/(1+(1-k \cdot (C \cdot h)^2)^{1/2} A4 \cdot h^4 + A6 \cdot h^6 + A8 \cdot h^8 + A10 \cdot h^{10} + A12 \cdot h^{12} \quad (A)$$

where X: an aspherical depth (the length of a vertical line downwardly extending from a point on an aspherical surface at a level "h" to a plane perpendicular to an optical axis to which a vertex of the aspherical surface contacts)

h: a height (a distance from the optical axis to a lens surface)

C: a reciprocal of a paraxial curvature radius, and

Am: an aspherical coefficient (m=4, 6, 8, 10, 12)

Various sets of data provided in Table 3 show a focal length of an entire system, a back focus length Bf of the entire system, an F number FNO, and a full field angle 2ω achieved at a wide angle end, those achieved at an intermediate field angle, and those achieved at a telephoto end. The unit of the full field angle 2ω is a degree.

Data pertaining to temperature changes in Table 4 show focal depths achieved at a wide angle end, focal depths achieved at an intermediate field angle, and focal depths achieved at a telephoto end, as well as showing displacements of an imaging point acquired when a temperature is changed within a range of ±30° C. and within a range of ±35° C. with reference to a reference temperature of 25° C.

A unit of "mm" can be used as the unit of the curvature radius and the surface spacing provided in Table 1, the unit of the aspherical depth X and the height "h" in the aspherical equation, the unit of the focal length of the entire system and the unit of the back focus length Bf of the entire system provided in Table 3, and the unit of displacement of the focal depth and the imaging point in Table 4. Even when the optical system is subjected to proportional enlargement or proportional reduction, equivalent optical performance is acquired. Therefore, the unit is not limited to "mm," and another appropriate unit can also be used.

In Example 1, four plastic lenses; namely, L2, L3, L4, and L5 are used. An aspherical lens is used for L4. Amounts of displacements of the imaging point obtained through calculation fall within an allowable range in response to a required temperature change of ±35° C., and the field angle achieved at the wide angle end is 133°. Thus, the objective of the invention is accomplished.

TABLE 1

Example 1
Lens data

| Surface | Curvature radius | Surface spacing | Nd | vd |
|---|---|---|---|---|
| 1 | 62.004 | 0.994 | 1.72916 | 54.7 |
| 2 | 8.746 | 5.927 | 1.00000 | . |
| 3 | −14.782 | 1.491 | 1.50959 | 56.2 |
| 4 | 10.261 | 0.275 | 1.00000 | . |
| 5 | 11.047 | 3.098 | 1.60595 | 26.9 |
| 6 | −227.463 | D6(Variable) | 1.00000 | . |
| 7 | Stop | D7(Variable) | 1.00000 | . |
| 8* | 7.622 | 5.000 | 1.50959 | 56.2 |
| 9* | −10.939 | 0.906 | 1.00000 | . |
| 10 | −10.002 | 1.500 | 1.60595 | 26.9 |
| 11 | 9.513 | 0.925 | 1.00000 | . |
| 12 | 15.762 | 3.200 | 1.69680 | 55.5 |
| 13 | −10.061 | D13(Variable) | 1.00000 | . |
| 14 | ∞ | 2.000 | 1.51633 | 64.1 |
| 15 | ∞ | 0.000 | | |

| Surface spacing | W | M | T |
|---|---|---|---|
| D6 | 18.727 | 5.445 | 2.223 |
| D7 | 7.230 | 4.165 | 1.100 |
| D13 | 5.000 | 8.065 | 11.130 |

TABLE 2

Example 1
Aspherical data

| Surface | κ | A4 | A6 | A8 | A10 | A12 |
|---|---|---|---|---|---|---|
| 8* | 1.27672 | −1.3655E−04 | −1.7893E−06 | 6.2363E−07 | −3.1232E−08 | 8.2613E−10 |
| 9* | −1.28510 | 5.1367E−04 | 1.6893E−06 | 9.4973E−07 | −6.7882E−08 | 2.7792E−09 |

TABLE 3

Example 1
Various sets of data

| | W | M | T |
|---|---|---|---|
| Focal length | 3.100 | 5.580 | 8.060 |
| Bf | 3.638 | 3.638 | 3.638 |
| FNO | 1.48 | 1.82 | 2.18 |
| 2ω | 132.9 | 63.5 | 43.1 |

TABLE 4

Example 1
Data of temperature change

| | W | M | T |
|---|---|---|---|
| +30° C. | 0.01 | 0.00 | −0.03 |
| −30° C. | −0.01 | 0.01 | 0.04 |
| +35° C. | 0.02 | 0.00 | −0.04 |
| −35° C. | −0.02 | 0.01 | 0.04 |
| Focal depth | ±0.04 | ±0.05 | ±0.06 |

Example 2

Figure 2:
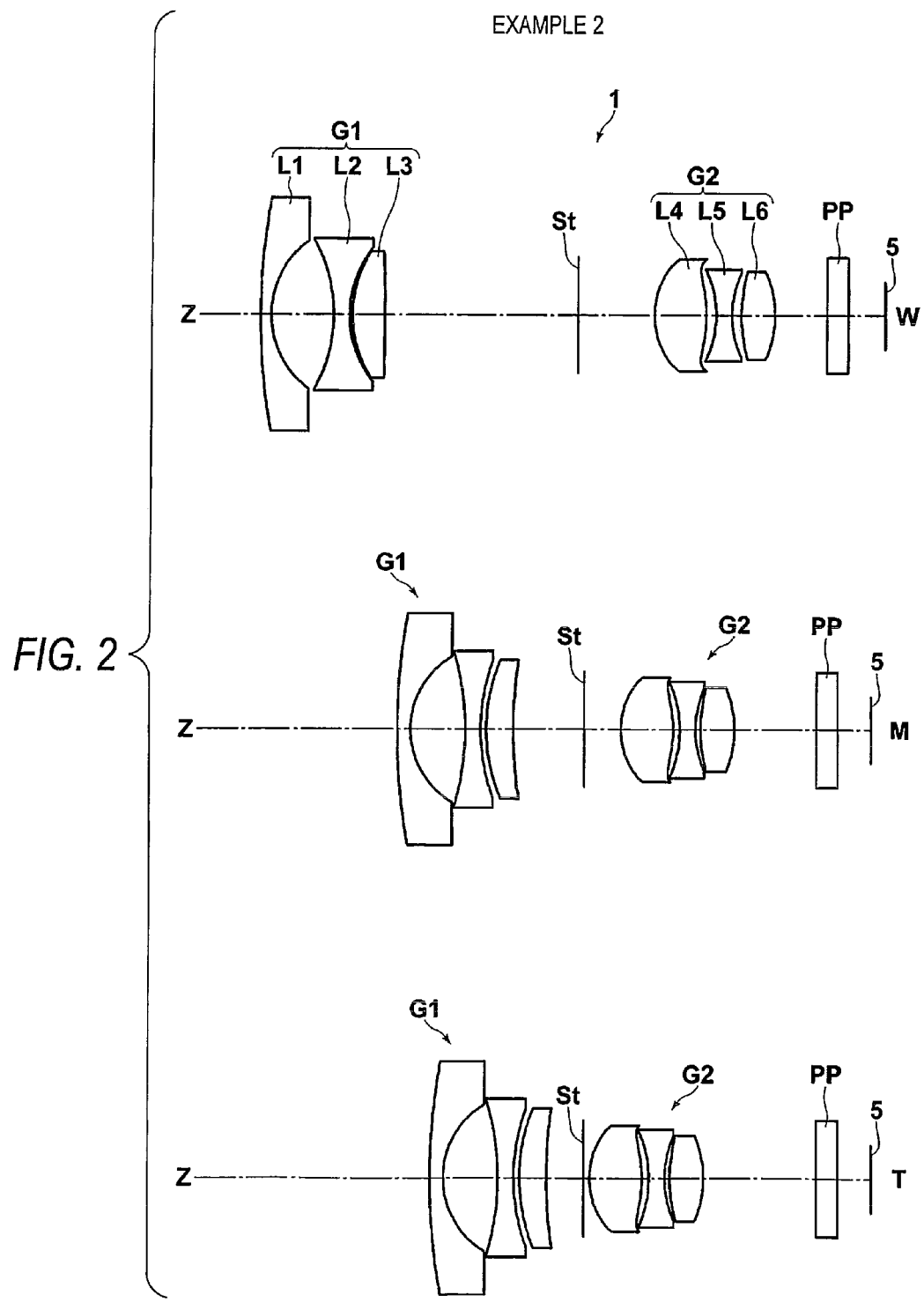
FIG. 2 is a cross-sectional view showing a lens configuration of an imaging lens of Example 2 of the present invention.

Table 5 shows lens data pertaining to a variable power optical system of Example 2; Table 6 shows aspherical data; Table 7 shows various data; and Table 8 shows temperature change data. FIG. 2 shows the configuration diagram of a lens (rough paths of movements of respective lens groups are omitted).

In Example 2, three plastic lenses L2, L4, and L5 are used. An aspherical lens is used for L4. Amounts of displacements of the imaging point obtained through calculation fall within an allowable range in response to a required temperature change of ±35° C., and the field angle achieved at the wide angle end is 126°. Thus, the objective of the invention is accomplished.

TABLE 5

Example 2
Lens data

| Surface | Curvature radius | Surface spacing | Nd | vd |
|---|---|---|---|---|
| 1 | 61.482 | 1.282 | 1.80400 | 46.6 |
| 2 | 8.063 | 5.314 | 1.00000 | |
| 3 | −24.460 | 1.500 | 1.50959 | 56.2 |
| 4 | 18.973 | 0.534 | 1.00000 | |
| 5 | 16.545 | 2.603 | 1.92285 | 18.9 |
| 6 | 43.864 | D6(Variable) | 1.00000 | |
| 7 | Stop | D7(Variable) | 1.00000 | |
| 8* | 7.284 | 4.988 | 1.50959 | 56.2 |
| 9* | −10.936 | 0.658 | 1.00000 | |
| 10 | −10.738 | 1.500 | 1.60595 | 26.9 |
| 11 | 9.973 | 0.490 | 1.00000 | |
| 12 | 15.382 | 3.200 | 1.65160 | 58.5 |
| 13 | −10.073 | D13(Variable) | 1.00000 | |
| 14 | ∞ | 2.000 | 1.51633 | 64.1 |
| 15 | ∞ | | 1.00000 | |

TABLE 5-continued

Example 2
Lens data

| Surface spacing | W | M | T |
|---|---|---|---|
| 6 | 19.921 | 6.779 | 3.504 |
| 7 | 6.375 | 3.485 | 0.593 |
| 13 | 5.000 | 7.890 | 10.782 |

TABLE 6

Example 2
Aspherical data

| Surface | κ | A4 | A6 | A8 | A10 | A12 |
|---|---|---|---|---|---|---|
| 8* | 1.59549 | −3.2520E−04 | 1.1223E−06 | −3.7667E−08 | −2.1810E−09 | 1.2035E−10 |
| 9* | 4.42373 | 1.1256E−03 | −1.6376E−06 | 3.0182E−06 | −1.8765E−07 | 6.2750E−09 |

TABLE 7

Example 2
Various sets of data

| | W | M | T |
|---|---|---|---|
| Focal length | 3.088 | 5.559 | 8.031 |
| Bf | 3.219 | 3.219 | 3.219 |
| FNO | 1.45 | 1.72 | 2.07 |
| 2ω | 126.30 | 63.14 | 43.05 |

TABLE 8

Example 2
Data of temperature change

| | W | M | T |
|---|---|---|---|
| +30° C. | 0.02 | 0.00 | −0.04 |
| −30° C. | −0.02 | 0.00 | 0.04 |
| +35° C. | 0.02 | 0.00 | −0.05 |
| −35° C. | −0.02 | 0.00 | 0.05 |
| Focal depth | ±0.04 | ±0.04 | ±0.05 |

Example 3

Table 9 shows lens data pertaining to a variable power optical system of Example 3; Table 10 shows aspherical data;

TABLE 9

Example 3
Lens data

| Surface | Curvature radius | Surface spacing | Nd | νd |
|---|---|---|---|---|
| 1 | 30.624 | 1.282 | 1.80400 | 46.6 |
| 2 | 7.559 | 5.298 | 1.00000 | |
| 3 | −22.270 | 1.501 | 1.50959 | 56.2 |
| 4 | 14.829 | 0.802 | 1.00000 | |
| 5 | 14.712 | 2.603 | 1.92285 | 18.9 |
| 6 | 33.216 | D6(Variable) | 1.00000 | |
| 7 | Stop | D7(Variable) | 1.00000 | |
| 8* | 7.457 | 4.920 | 1.50959 | 56.2 |
| 9* | −10.220 | 1.315 | 1.00000 | |
| 10 | −12.365 | 1.500 | 1.60595 | 26.9 |
| 11 | 7.700 | 0.890 | 1,00000 | |
| 12 | 11.889 | 3.200 | 1.62299 | 58.2 |
| 13 | −9.721 | D13(Variable) | 1.00000 | |
| 14 | ∞ | 2.000 | 1.51633 | 64.1 |
| 15 | ∞ | 0.000 | 1.00000 | |

| Surface spacing | W | M | T |
|---|---|---|---|
| 6 | 17.988 | 5.500 | 1.864 |
| 7 | 7.321 | 4.326 | 1.331 |
| 13 | 5.000 | 7.995 | 10.990 |

TABLE 10

Example 3
Aspherical data

| Surface | κ | A4 | A6 | A8 | A10 | A12 |
|---|---|---|---|---|---|---|
| 8* | 1.37932 | −3.0373E−04 | −7.0981E−06 | 5.9932E−07 | −3.7179E−08 | 8.1139E−10 |
| 9* | −3.53579 | 1.3666E−04 | 3.7493E−06 | 2.4538E−07 | −3.0444E−08 | 1.1629E−09 |

Table 11 shows various data; and Table 12 shows temperature change data. FIG. 3 shows the configuration diagram of a lens (rough paths of movements of respective lens groups are omitted).

In Example 3, three plastic lenses L2, L4, and L5 are used. An aspherical lens is used for L4. Amounts of displacements of the imaging point obtained through calculation fall within an allowable range in response to a required temperature change of ±35° C., and the field angle achieved at the wide angle end is 121°. Thus, the objective of the invention is accomplished.

TABLE 11

Example 3
Various sets of data

| | W | M | T |
|---|---|---|---|
| Focal length | 3.067 | 5.521 | 7.975 |
| Bf | 2.481 | 2.480 | 2.481 |
| FNO | 1.46 | 1.80 | 2.18 |
| 2ω | 120.8 | 63.1 | 43.2 |

TABLE 12

Example 3
Data of temperature change

|  | W | M | T |
|---|---|---|---|
| +30° C. | 0.04 | 0.00 | −0.02 |
| −30° C. | −0.03 | 0.00 | 0.05 |
| +35° C. | 0.04 | 0.00 | −0.02 |
| −35° C. | −0.03 | 0.01 | 0.06 |
| Focal depth | ±0.04 | ±0.05 | ±0.06 |

Example 4

Figure 4:
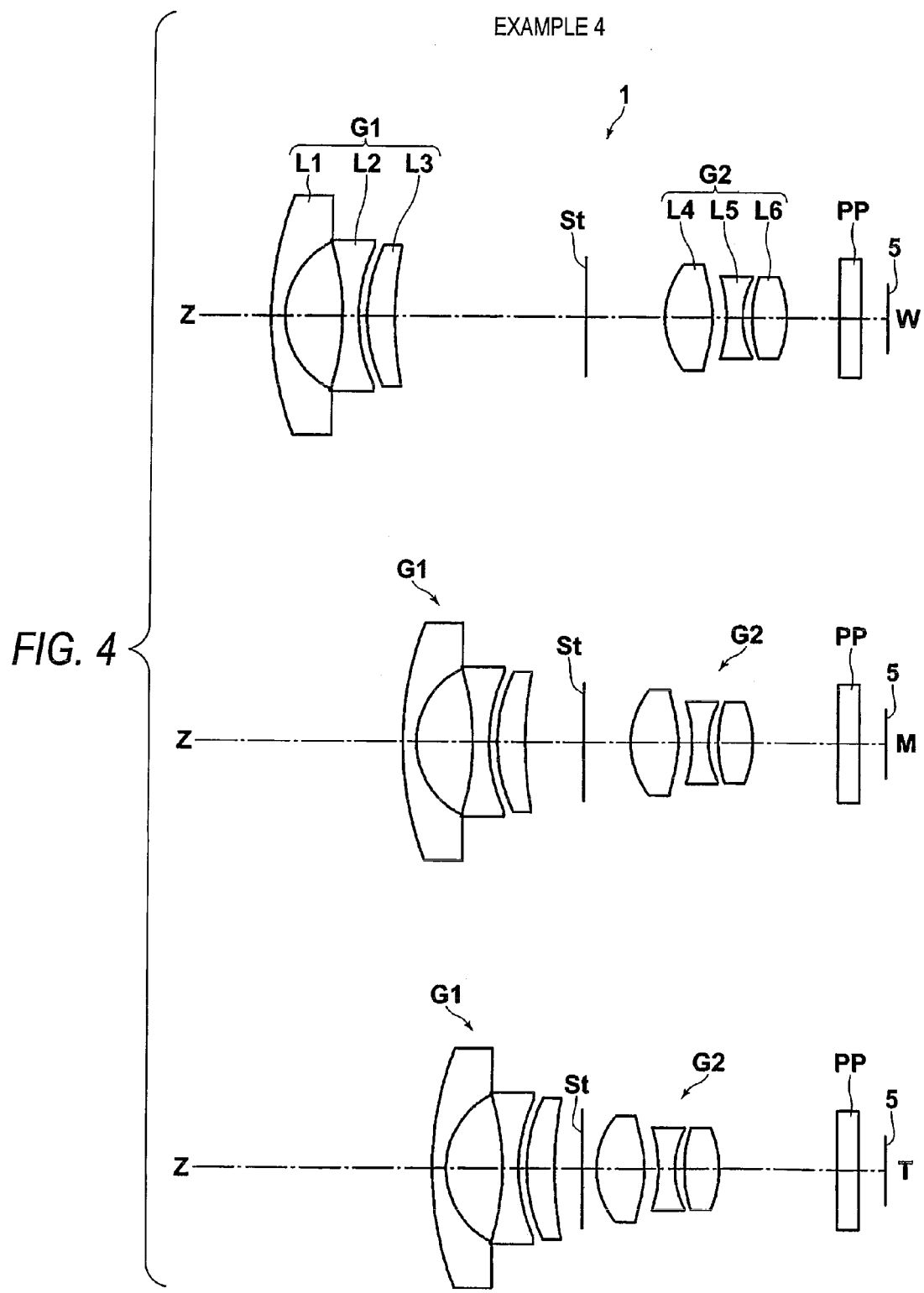
FIG. 4 is a cross-sectional view showing a lens configuration of an imaging lens of Example 4 of the present invention.

Table 13 shows lens data pertaining to a variable power optical system of Example 4; Table 14 shows aspherical data; Table 15 shows various data; and Table 16 shows temperature change data. FIG. 4 shows the configuration diagram of a lens (rough paths of movements of respective lens groups are omitted).

In Example 4, three plastic lenses L1, L4, and L5 are used. An aspherical lens is used for L4. Amounts of displacements of the imaging point obtained through calculation fall within an allowable range in response to a required temperature change of ±35° C., and the field angle achieved at the wide angle end is 127°. Thus, the objective of the invention is accomplished.

TABLE 13

Example 4
Lens data

| Surface | Curvature radius | Surface spacing | Nd | νd |
|---|---|---|---|---|
| 1 | 36.648 | 1.500 | 1.50959 | 56.2 |
| 2 | 8.161 | 6.031 | 1.00000 | . |
| 3 | −23.748 | 1.282 | 1.80400 | 46.6 |
| 4 | 11.899 | 1.145 | 1.00000 | . |
| 5 | 14.658 | 2.603 | 1.92285 | 18.9 |
| 6 | 55.165 | D6 (Variable) | 1.00000 | . |
| 7 | Stop | D7 (Variable) | 1.00000 | . |
| 8* | 7.758 | 4.435 | 1.50959 | 56.2 |
| 9* | −9.900 | 0.964 | 1.00000 | . |
| 10 | −12.699 | 1.500 | 1.60595 | 26.9 |
| 11 | 7.978 | 1.293 | 1.00000 | . |
| 12 | 13.988 | 3.200 | 1.62299 | 58.2 |
| 13 | −8.868 | D13 (Variable) | 1.00000 | . |
| 14 | ∞ | 2.000 | 1.51633 | 64.1 |
| 15 | ∞ | 0.000 | 1.00000 | . |

| Surface spacing | W | M | T |
|---|---|---|---|
| 6 | 16.772 | 5.055 | 2.480 |
| 7 | 7.380 | 4.239 | 1.100 |
| 13 | 5.000 | 8.141 | 11.280 |

TABLE 14

Example 4
Aspherical data

| Surface | κ | A4 | A6 | A8 | A10 | A12 |
|---|---|---|---|---|---|---|
| 8* | 0.7062345 | −8.30E−05 | 2.82E−06 | 3.31E−07 | −2.44E−08 | 8.06E−10 |
| 9* | −0.7173281 | 5.49E−04 | 8.50E−06 | −4.60E−07 | −1.52E−10 | 9.51E−10 |

TABLE 15

Example 4
Various sets of data

|  | W | M | T |
|---|---|---|---|
| Focal length | 3.069 | 5.524 | 7.978 |
| Bf | 3.322 | 3.322 | 3.322 |
| FNO | 1.45 | 1.78 | 2.17 |
| 2ω | 127.4 | 63.8 | 43.5 |

TABLE 16

Example 4
Data of temperature change

|  | W | M | T |
|---|---|---|---|
| +30° C. | 0.01 | 0.01 | −0.02 |
| −30° C. | −0.01 | 0.01 | 0.05 |
| +35° C. | 0.02 | 0.01 | −0.02 |
| −35° C. | −0.01 | 0.01 | 0.05 |
| Focal depth | ±0.04 | ±0.04 | ±0.06 |

Example 5

Figure 5:
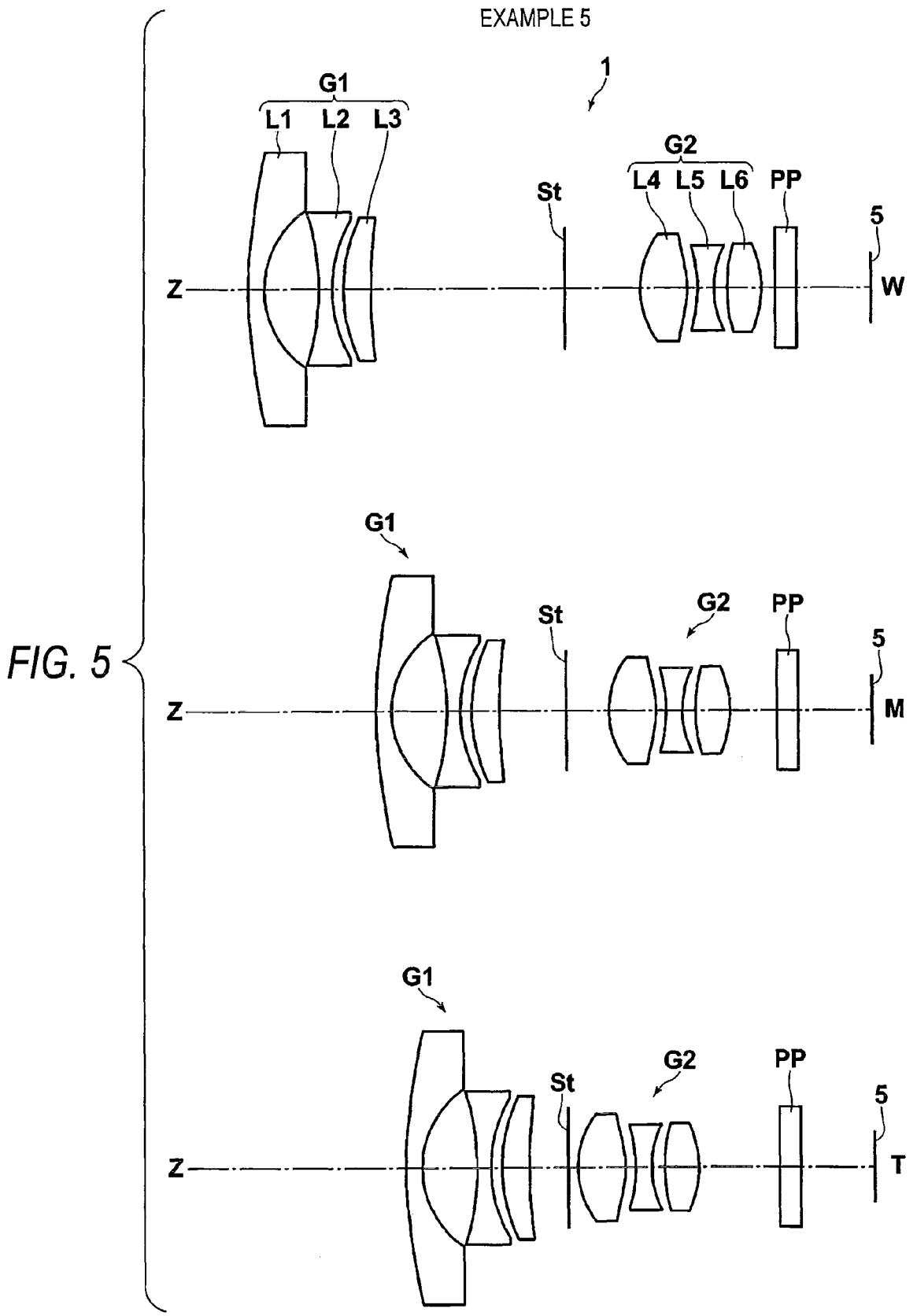
FIG. 5 is a cross-sectional view showing a lens configuration of an imaging lens of Example 5 of the present invention.

Table 17 shows lens data pertaining to a variable power optical system of Example 5; Table 18 shows aspherical data; Table 19 shows various data; and Table 20 shows temperature change data. FIG. 5 shows the configuration diagram of a lens (rough paths of movements of respective lens groups are omitted).

In Example 5, three plastic lenses L1, L4, and L5 are used. An aspherical lens is used for L1 and L4. Amounts of displacements of the imaging point obtained through calculation fall within an allowable range in response to a required temperature change of ±35° C., and the field angle achieved at the wide angle end is 143°. Thus, the objective of the invention is accomplished.

TABLE 17

Example 5
Lens data

| Surface | Curvature radius | Surface spacing | Nd | νd |
|---|---|---|---|---|
| 1* | 32.749 | 1.5 | 1.50959 | 56.2 |
| 2* | 8.218 | 5.134 | 1.00000 |  |
| 3 | −22.77 | 1.282 | 1.80400 | 46.6 |
| 4 | 12.323 | 1.063 | 1.00000 |  |
| 5 | 14.849 | 2.603 | 1.92285 | 18.9 |
| 6 | 51.552 | D6(Variable) | 1.00000 |  |
| 7 | Stop | D7(Variable) | 1.00000 | . |
| 8* | 7.823 | 4.435 | 1.50959 | 56.2 |
| 9* | −9.834 | 0.97 | 1.00000 |  |
| 10 | −13.021 | 1.5 | 1.60595 | 26.9 |
| 11 | 8.335 | 1.245 | 1.00000 |  |

TABLE 17-continued

Example 5
Lens data

| 12 | 14.255 | 3.2 | 1.62299 | 58.2 |
| 13 | −9.324 | D13(Variable) | 1.00000 | |
| 14 | ∞ | 2 | 1.51633 | 64.1 |
| 15 | ∞ | | 1.00000 | |

| Surface spacing | W | M | T |
|---|---|---|---|
| 6 | 18.239 | 6.285 | 3.596 |
| 7 | 7.118 | 4.017 | 0.915 |
| 13 | 5.000 | 8.101 | 11.203 |

TABLE 18

Example 5
Aspherical data

| Surface | κ | A4 | A6 | A8 | A10 | A12 |
|---|---|---|---|---|---|---|
| 1* | −20.88786 | −2.0187E−05 | 9.6894E−08 | 4.4525E−10 | 6.1289E−13 | −1.2730E−14 |
| 2* | 1.15018 | −1.6281E−04 | 1.0064E−06 | −9.5657E−08 | 1.8500E−09 | −2.1497E−11 |
| 8* | 0.32346 | −2.4939E−05 | 2.6083E−06 | 3.2530E−07 | −1.8688E−08 | 5.4523E−10 |
| 9* | −0.56542 | 5.0799E−04 | 1.1259E−06 | 1.0176E−07 | −1.2974E−08 | 6.7190E−10 |

TABLE 19

Example 5
Various sets of data

| | W | M | T |
|---|---|---|---|
| Focal length | 3.096 | 5.573 | 8.050 |
| Bf | 3.213 | 3.213 | 3.213 |
| FNO | 1.46 | 1.78 | 2.15 |
| 2ω | 142.9 | 64.2 | 43.3 |

TABLE 20

Example 5
Data of temperature change

| | W | M | T |
|---|---|---|---|
| +30° C. | 0.02 | 0.02 | −0.01 |
| −30° C. | −0.02 | 0.00 | 0.03 |
| +35° C. | 0.02 | 0.02 | −0.02 |
| −35° C. | −0.02 | 0.00 | 0.04 |
| Focal depth | ±0.04 | ±0.04 | ±0.06 |

Example 6

Figure 6:
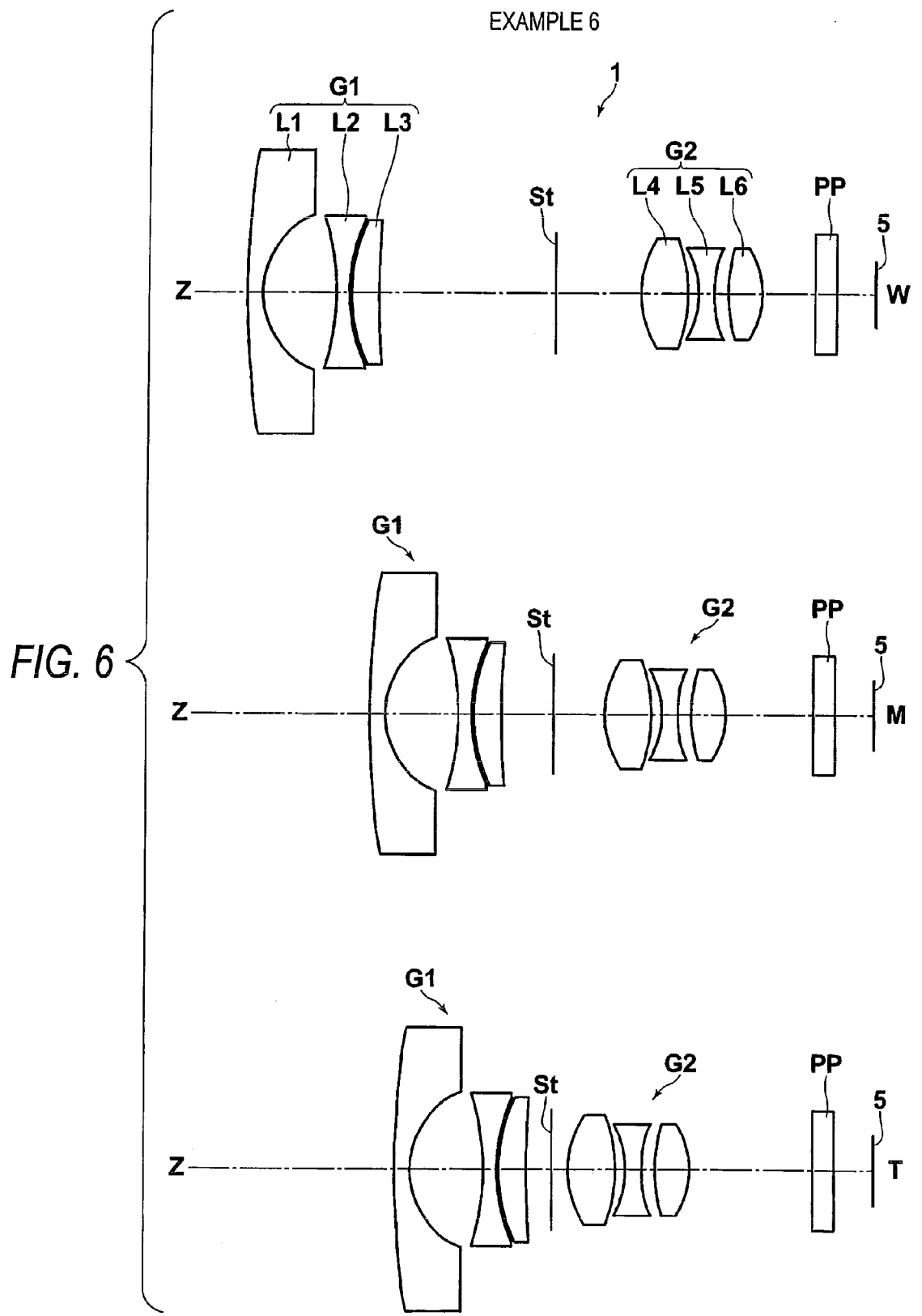
FIG. 6 is a cross-sectional view showing a lens configuration of an imaging lens of Example 6 of the present invention.

Table 21 shows lens data pertaining to a variable power optical system of Example 6; Table 22 shows aspherical data; Table 23 shows various data; and Table 24 shows temperature change data. FIG. 6 shows the configuration diagram of a lens (rough paths of movements of respective lens groups are omitted).

In Example 6, three plastic lenses L1, L5, and L6 are used. An aspherical lens is used for L1 and L5. Amounts of displacements of the imaging point obtained through calculation are slightly in excess of an allowable range in response to a required temperature change of ±35° C., and the field angle achieved at the wide angle end is 128°. Thus, the objective of the invention is accomplished.

TABLE 21

Example 6
Lens data

| Surface | Curvature radius | Surface spacing | Nd | νd |
|---|---|---|---|---|
| 1* | 54.274 | 1.500 | 1.50959 | 56.2 |
| 2* | 7.664 | 6.870 | 1.00000 | |
| 3 | −23.029 | 1.282 | 1.80400 | 46.6 |
| 4 | 15.813 | 0.202 | 1.00000 | |
| 5 | 15.247 | 2.603 | 1.92285 | 18.9 |
| 6 | 82.345 | D6(Variable) | 1.00000 | |
| 7 | Stop | D7(Variable) | 1.00000 | . |
| 8 | 8.936 | 4.435 | 1.62041 | 60.3 |
| 9 | −13.614 | 0.974 | 1.00000 | |
| 10* | −7.906 | 1.500 | 1.60595 | 26.9 |
| 11* | 18.048 | 1.276 | 1.00000 | |
| 12 | 14.892 | 3.200 | 1.50959 | 56.2 |
| 13 | −7.671 | D13(Variable) | 1.00000 | |
| 14 | ∞ | 2.000 | 1.51633 | 64.1 |
| 15 | ∞ | 0.000 | 1.00000 | |

| Surface spacing | W | M | T |
|---|---|---|---|
| 6 | 16.700 | 4.920 | 2.393 |
| 7 | 8.069 | 4.812 | 1.556 |
| 13 | 5.000 | 8.257 | 11.513 |

TABLE 22

Example 6
Aspherical data

| Surface | κ | A4 | A6 | A8 | A10 | A12 |
|---|---|---|---|---|---|---|
| 1* | −42.63221 | −2.4193E−05 | 9.1206E−08 | 5.3412E−10 | −7.6762E−14 | −5.5193E−15 |
| 2* | 1.11378 | −8.0269E−05 | −1.7369E−06 | −2.2220E−08 | 1.6255E−09 | −3.7051E−11 |
| 8* | −0.69526 | 1.9386E−04 | −2.0335E−05 | −1.6201E−06 | 1.3691E−07 | −2.8400E−09 |
| 9* | 11.37628 | 1.2413E−03 | −2.3960E−05 | −4.1957E−07 | 3.1391E−08 | −5.5153E−10 |

TABLE 23

Example 6
Various sets of data

|  | W | M | T |
|---|---|---|---|
| Focal length | 3.260 | 5.868 | 8.476 |
| Bf | 3.741 | 3.741 | 3.741 |
| FNO | 1.46 | 1.80 | 2.18 |
| 2ω | 128.4 | 60.9 | 41.1 |

TABLE 24

Example 6
Data of temperature change

|  | W | M | T |
|---|---|---|---|
| +30° C. | −0.06 | −0.06 | −0.07 |
| −30° C. | 0.05 | 0.06 | 0.07 |

TABLE 24-continued

Example 6
Data of temperature change

|  | W | M | T |
|---|---|---|---|
| +35° C. | −0.07 | −0.07 | −0.09 |
| −35° C. | 0.06 | 0.07 | 0.08 |
| Focal depth | ±0.04 | ±0.05 | ±0.06 |

Example 7

Figure 7:
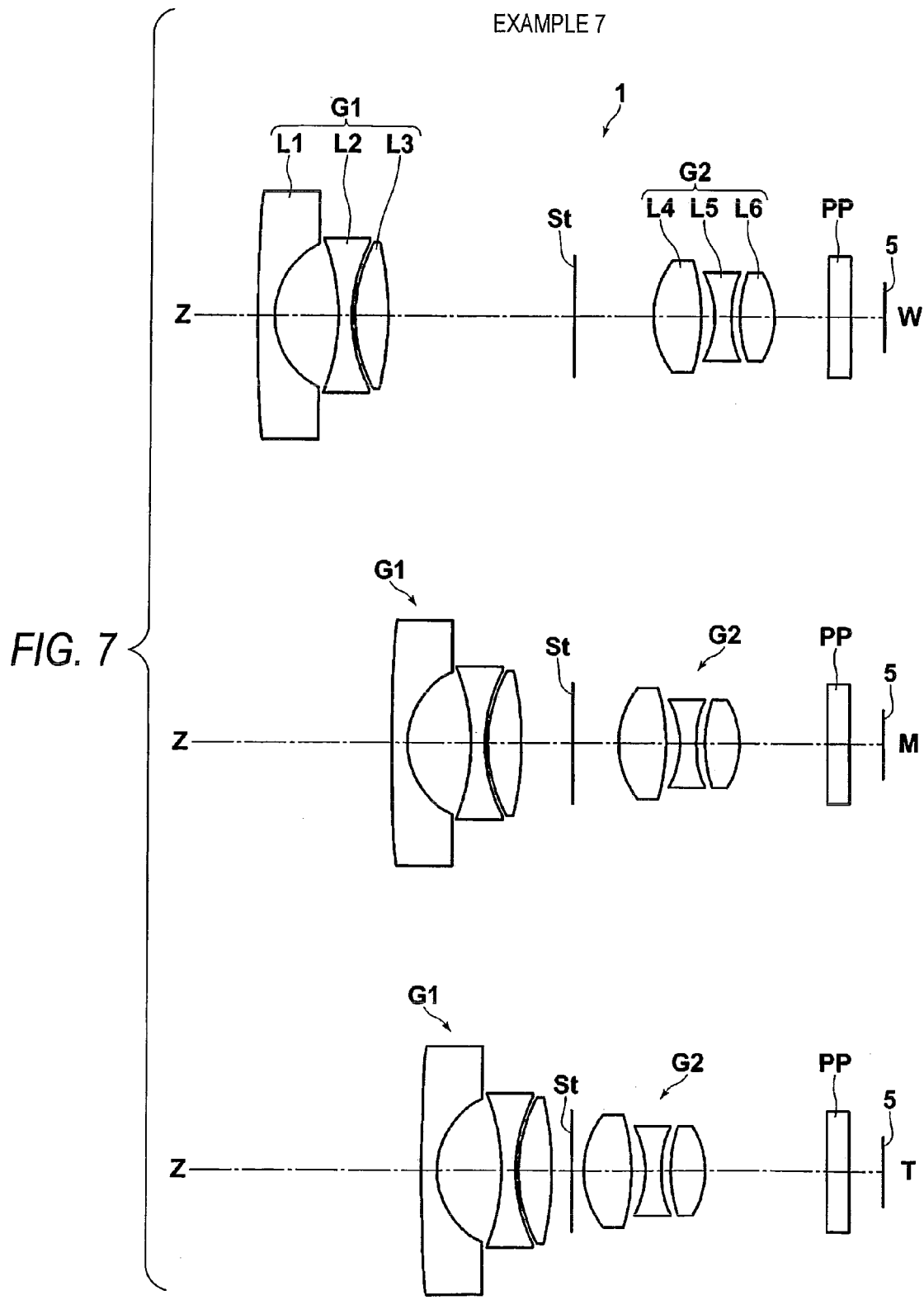
FIG. 7 is a cross-sectional view showing a lens configuration of an imaging lens of Example 7 of the present invention.

Table 25 shows lens data pertaining to a variable power optical system of Example 7; Table 26 shows aspherical data; Table 27 shows various data; and Table 28 shows temperature change data. FIG. 7 shows the configuration diagram of a lens (rough paths of movements of respective lens groups are omitted).

In Example 7, four plastic lenses L1, L3, L5, and L6 are used. An aspherical lens is used for L1 and L5. Amounts of displacements of the imaging point obtained through calculation slightly surpass at a wide angle end an allowable range in response to a required temperature change of ±35° C., and the field angle achieved at the wide angle end is 125°. Thus, an objective of the invention is accomplished.

TABLE 25

Example 7
Lens data

| Surface | Curvature radius | Surface spacing | Nd | vd |
|---|---|---|---|---|
| 1* | 96.414 | 1.500 | 1.50959 | 56.2 |
| 2* | 6.773 | 5.924 | 1.00000 |  |
| 3 | −18.370 | 1.282 | 1.80400 | 46.6 |
| 4 | 14.191 | 0.282 | 1.00000 |  |
| 5 | 13.408 | 3.103 | 1.60595 | 26.9 |
| 6 | −28.776 | D6(Variable) | 1.00000 |  |
| 7 | Stop | D7(Variable) | 1.00000 | . |
| 8 | 8.174 | 4.435 | 1.62041 | 60.3 |
| 9 | −17.118 | 1.303 | 1.00000 |  |
| 10* | −7.182 | 1.500 | 1.60595 | 26.9 |
| 11* | 16.580 | 0.827 | 1.00000 |  |
| 12 | 11.669 | 3.200 | 1.50959 | 56.2 |
| 13 | −7.544 | D13(Variable) | 1.00000 |  |
| 14 | ∞ | 2.000 | 1.51633 | 64.1 |
| 15 | ∞ | 0.000 | 1.00000 |  |

| Surface spacing | W | M | T |
|---|---|---|---|
| 6 | 17.416 | 4.776 | 1.842 |
| 7 | 7.413 | 4.279 | 1.145 |
| 13 | 5.000 | 8.134 | 11.268 |

TABLE 26

Example 7
Aspherical data

| Surface | κ | A4 | A6 | A8 | A10 | A12 |
|---|---|---|---|---|---|---|
| 1* | −251.392 | −6.3430E−05 | 7.9890E−07 | −9.5956E−10 | −1.7515E−11 | 6.3235E−14 |
| 2* | 0.97098 | −2.0555E−04 | 4.5969E−06 | −4.2368E−07 | 1.0572E−08 | −1.0419E−10 |
| 10* | −2.23022 | 1.9521E−04 | −5.5270E−05 | 4.8379E−07 | 9.7877E−08 | −2.8176E−09 |
| 11* | 14.44895 | 1.7716E−03 | −6.6475E−05 | −2.5539E−08 | 1.1185E−07 | −6.1694E−09 |

TABLE 27

Example 7
Various sets of data

|  | W | M | T |
|---|---|---|---|
| Focal length | 3.111 | 5.600 | 8.090 |
| Bf | 3.211 | 3.211 | 3.211 |
| FNO | 1.46 | 1.79 | 2.13 |
| 2ω | 125.1 | 63.1 | 42.9 |

TABLE 28

Example 7
Data of temperature change

|  | W | M | T |
|---|---|---|---|
| +30° C. | −0.04 | 0.01 | 0.01 |
| −30° C. | 0.04 | 0.02 | −0.04 |
| +35° C. | −0.05 | 0.01 | 0.01 |
| −35° C. | 0.05 | 0.02 | −0.04 |
| Focal depth | ±0.04 | ±0.04 | ±0.06 |

Example 8

Figure 8:
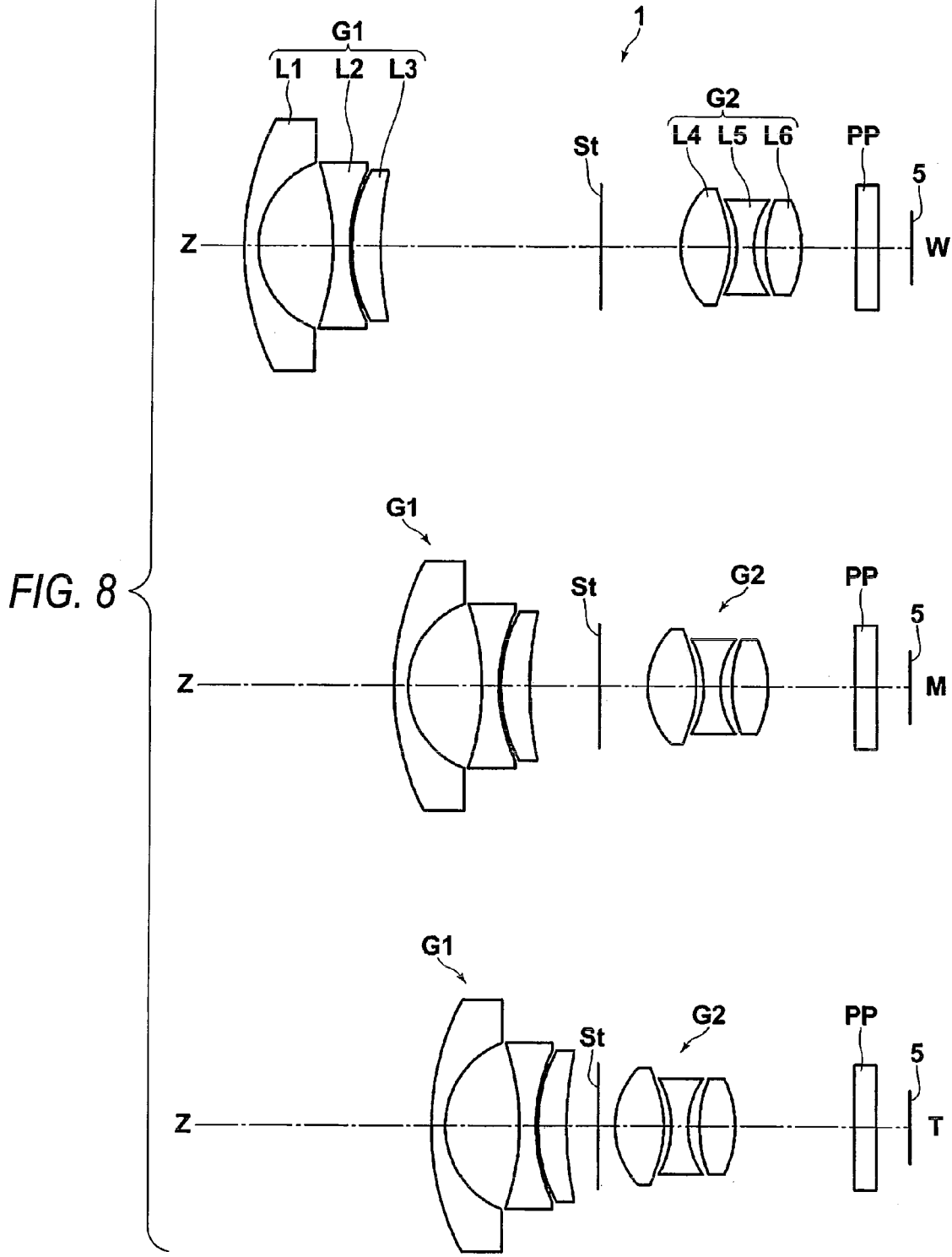
FIG. 8 is a cross-sectional view showing a lens configuration of an imaging lens of Example 8 of the present invention.

Table 29 shows lens data pertaining to a variable power optical system of Example 8; Table 30 shows aspherical data; Table 31 shows various data; and Table 32 shows temperature change data. FIG. 8 shows the configuration diagram of a lens (rough paths of movements of respective lens groups are omitted).

In Example 8, three plastic lenses L2, L4, and L5 are used. An aspherical lens is used for L4. Amounts of displacements of the imaging point obtained through calculation slightly surpass at a telephone end an allowable range in response to a required temperature change of ±35° C., and the field angle achieved at the wide angle end is 123°. Thus, the objective of the invention is accomplished.

TABLE 29

Example 8
Lens data

| Surface | Curvature radius | Surface spacing | Nd | vd |
|---|---|---|---|---|
| 1 | 23.57 | 1.282 | 1.80400 | 46.6 |
| 2 | 7.762 | 6.664 | 1.00000 | |
| 3 | −21.599 | 1.501 | 1.50959 | 56.2 |
| 4 | 15.093 | 0.2 | 1.00000 | |
| 5 | 13.738 | 2.603 | 1.92285 | 18.9 |
| 6 | 29.426 | D6(Variable) | 1.00000 | |
| 7 | Stop | D7(Variable) | 1.00000 | |
| 8* | 6.885 | 4.435 | 1.50959 | 56.2 |
| 9* | −8.413 | 0.652 | 1.00000 | |
| 10 | −8.365 | 1.5 | 1.58364 | 30.3 |
| 11 | 7.093 | 1.05 | 1.00000 | |
| 12 | 11.417 | 3.2 | 1.62041 | 60.3 |
| 13 | −9.361 | D13(Variable) | 1.00000 | |
| 14 | ∞ | 2 | 1.51633 | 64.1 |
| 15 | ∞ | 0.000 | 1.00000 | |

| Surface spacing | W | M | T |
|---|---|---|---|
| 6 | 20.026 | 6.341 | 2.825 |
| 7 | 7.191 | 4.355 | 1.517 |
| 13 | 5.000 | 7.836 | 10.674 |

TABLE 30

Example 8
Aspherical data

| Surface | κ | A4 | A6 | A8 | A10 | A12 |
|---|---|---|---|---|---|---|
| 8* | 1.39118 | −3.4605E−04 | −5.2376E−06 | 3.2182E−07 | −2.3448E−08 | 2.7083E−10 |
| 9* | −2.56381 | 2.0695E−05 | −6.9270E−07 | 7.9894E−07 | −6.6235E−08 | 1.5664E−09 |

TABLE 31

Example 8
Various sets of data

| | W | M | T |
|---|---|---|---|
| Focal length | 3.141 | 5.655 | 8.169 |
| Bf | 3.058 | 3.058 | 3.058 |
| FNO | 1.46 | 1.72 | 2.01 |
| 2ω | 123.4 | 64.8 | 44.3 |

TABLE 32

Example 8
Data of temperature change

| | W | M | T |
|---|---|---|---|
| +30° C. | 0.02 | −0.02 | −0.06 |
| −30° C. | −0.02 | 0.02 | 0.08 |
| +35° C. | 0.03 | −0.02 | −0.07 |
| −35° C. | −0.02 | 0.02 | 0.09 |
| Focal depth | ±0.04 | ±0.04 | ±0.05 |

In some of Examples 1 through 8, the amounts of displacement of the imaging point determined by computation exceed the allowable range. However, the amounts of displacement may also be made allowable by selection of a material for a lens barrel frame. In general, it is possible to provide the lenses as an inexpensive variable power optical system for a surveillance camera that enables assertion of advantages of the invention and that fulfills high specifications.

Table 33 shows values fulfilling the conditional expressions (1), (2), (3), and (4) relating to the variable power optical systems of Examples 1 through 8. The values of Table 33 conform to the D line (a wavelength of 587.6 nm). As is evident from Table 33, all of Examples 1 through 8 fulfill the conditional expressions (1), (2), (3), and (4).

TABLE 33

| | P1 | P2 | fB/fF | f6/f4 |
|---|---|---|---|---|
| Example 1 | −0.0886 | −0.0768 | −1.2358 | 0.9576 |
| Example 2 | −0.0368 | −0.0451 | −1.1699 | 1.0398 |
| Example 3 | −0.1780 | −0.0709 | −1.2205 | 0.9847 |
| Example 4 | −0.1463 | −0.0609 | −1.2791 | 0.9872 |
| Example 5 | −0.1408 | −0.0475 | −1.2521 | 1.0218 |
| Example 6 | −0.1841 | −0.0547 | −1.2485 | 1.1097 |
| Example 7 | −0.0160 | −0.0585 | −1.2590 | 0.9967 |
| Example 8 | −0.1826 | −0.1133 | −1.1284 | 1.0697 |

Figure 9:
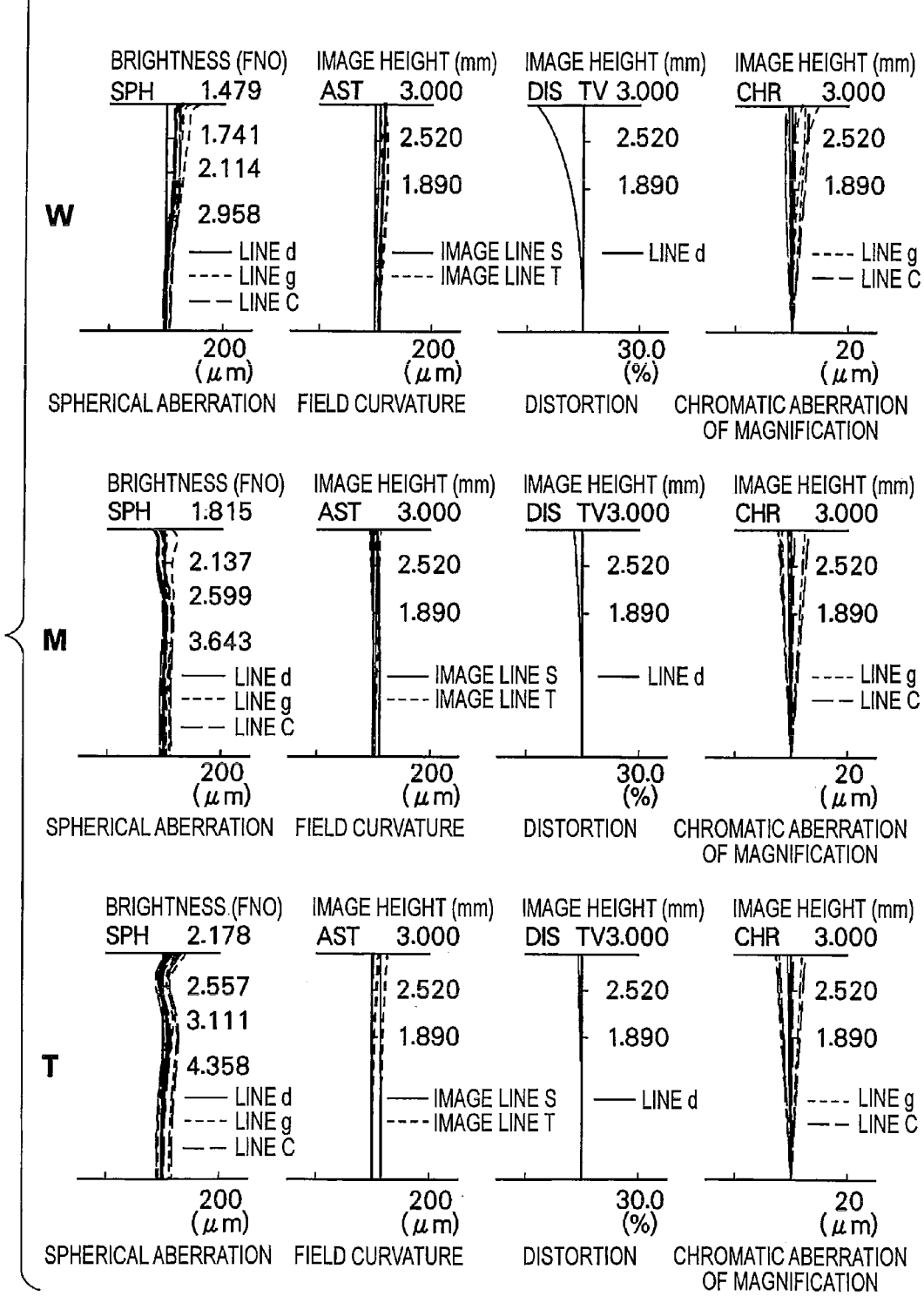
FIG. 9 is a chart of aberrations of the imaging lens of Example 1 of the present invention.
Figure 10:
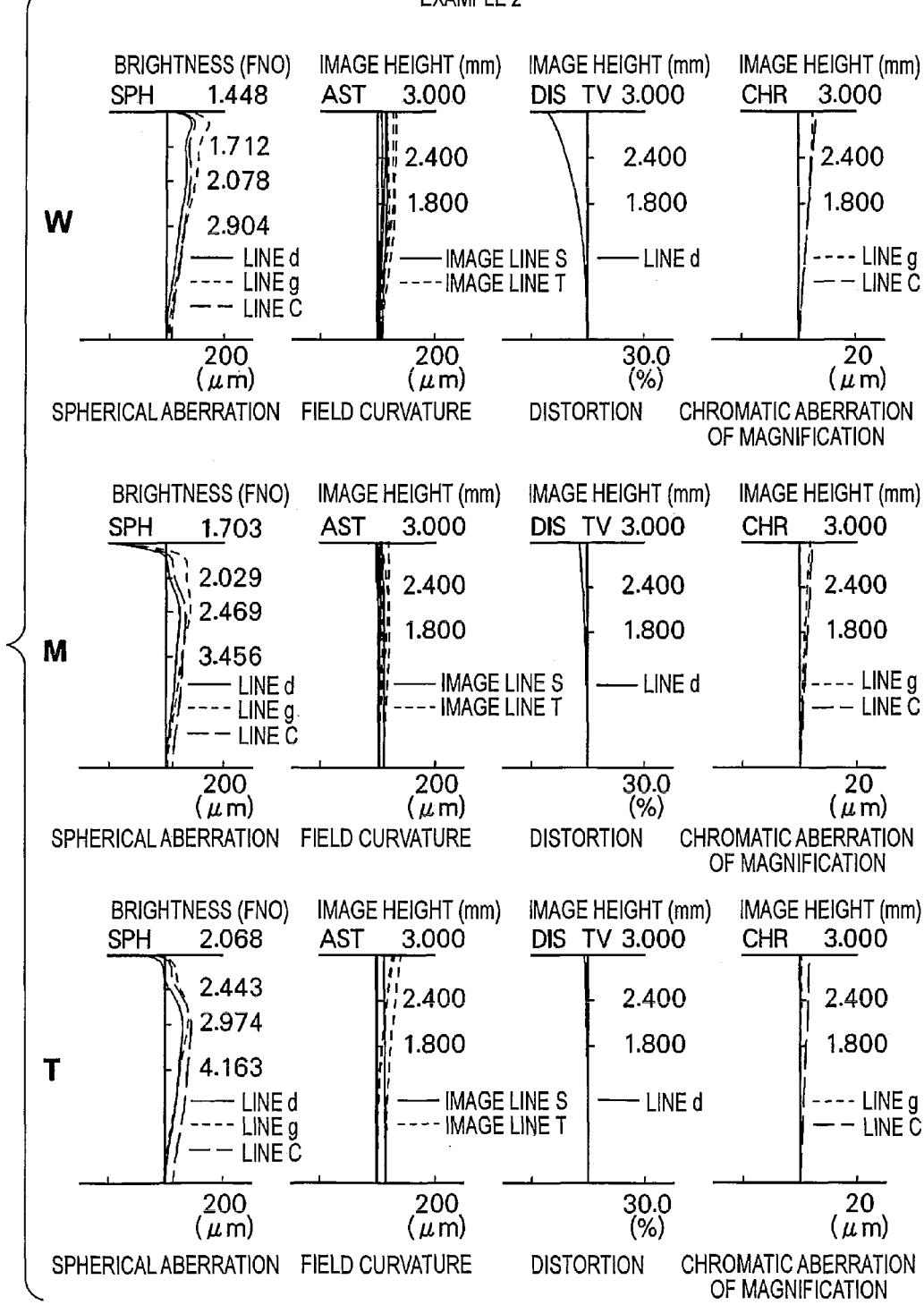
FIG. 10 is a chart of aberrations of the imaging lens of Example 2 of the present invention.
Figure 11:
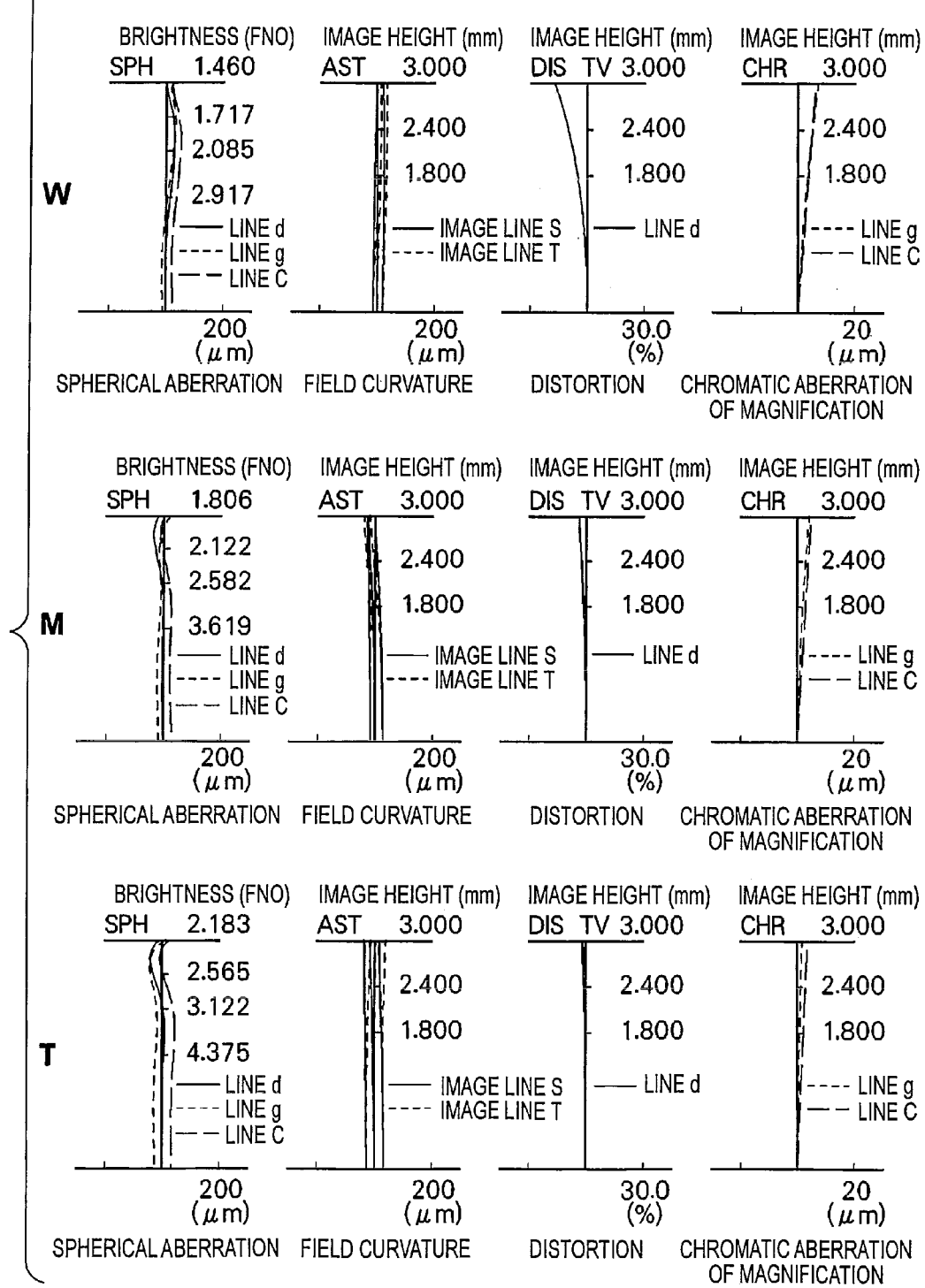
FIG. 11 is a chart of aberrations of the imaging lens of Example 3 of the present invention.
Figure 12:
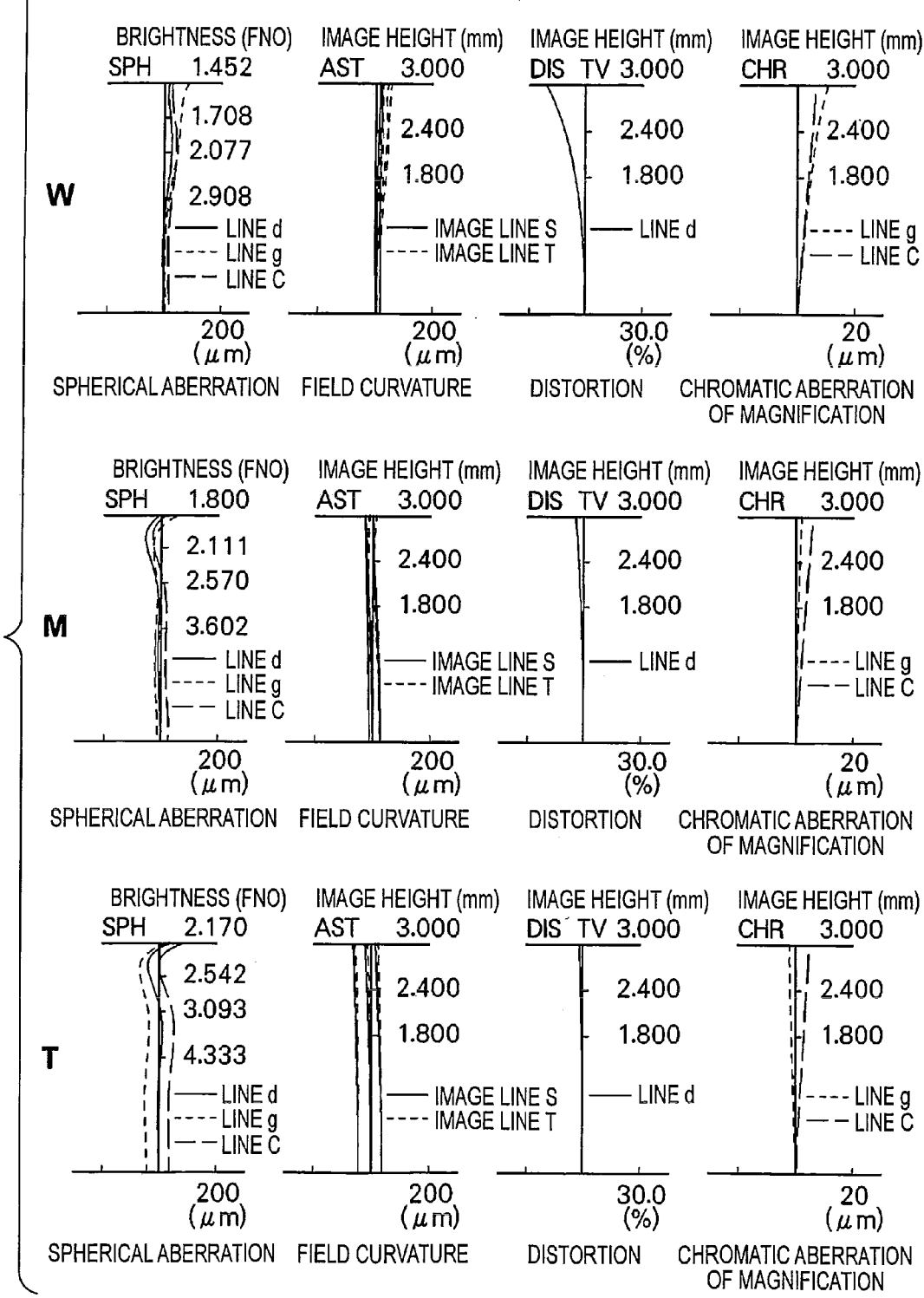
FIG. 12 is a chart of aberrations of the imaging lens of Example 4 of the present invention.
Figure 13:
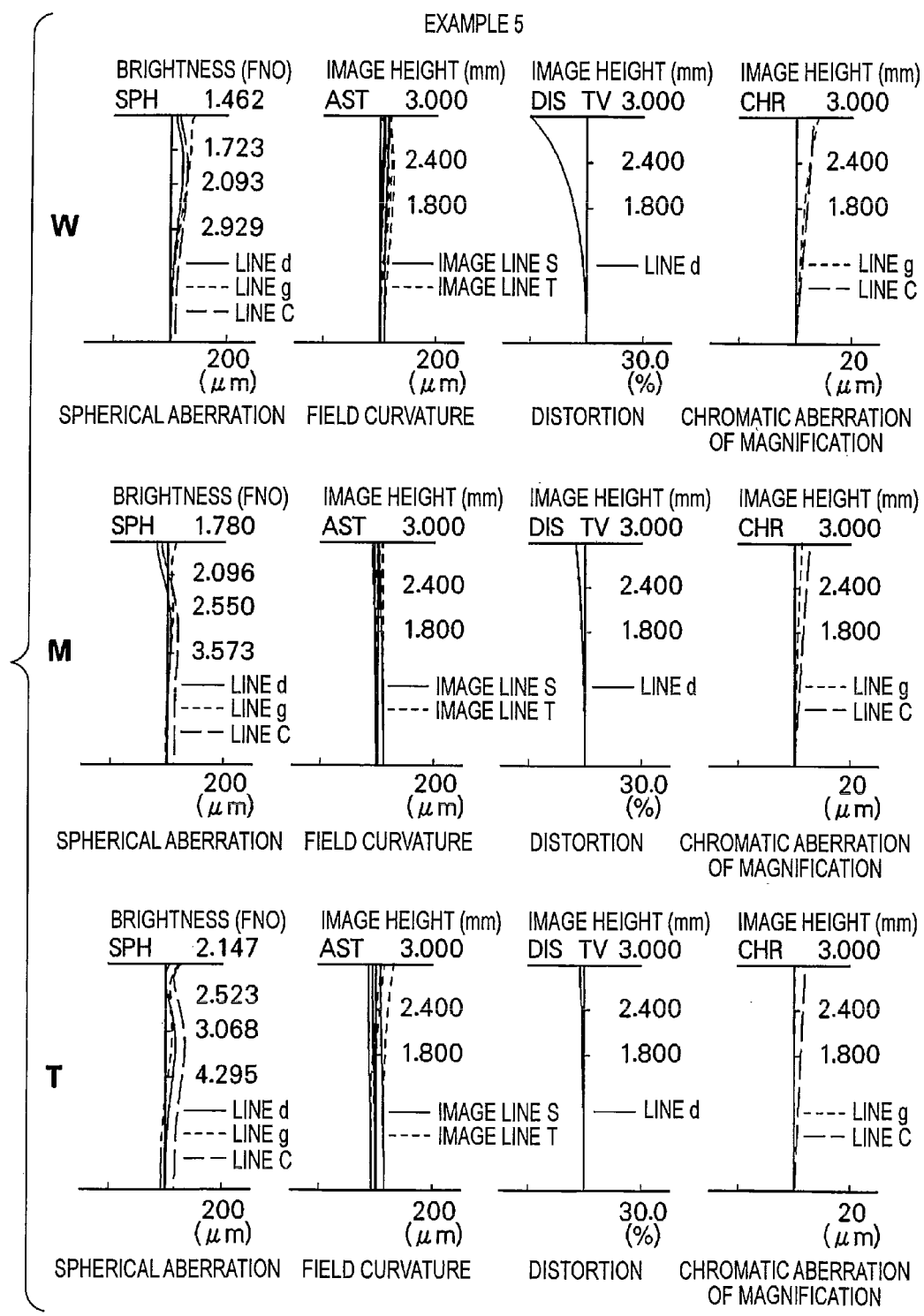
FIG. 13 is a chart of aberrations of the imaging lens of Example 5 of the present invention.
Figure 14:
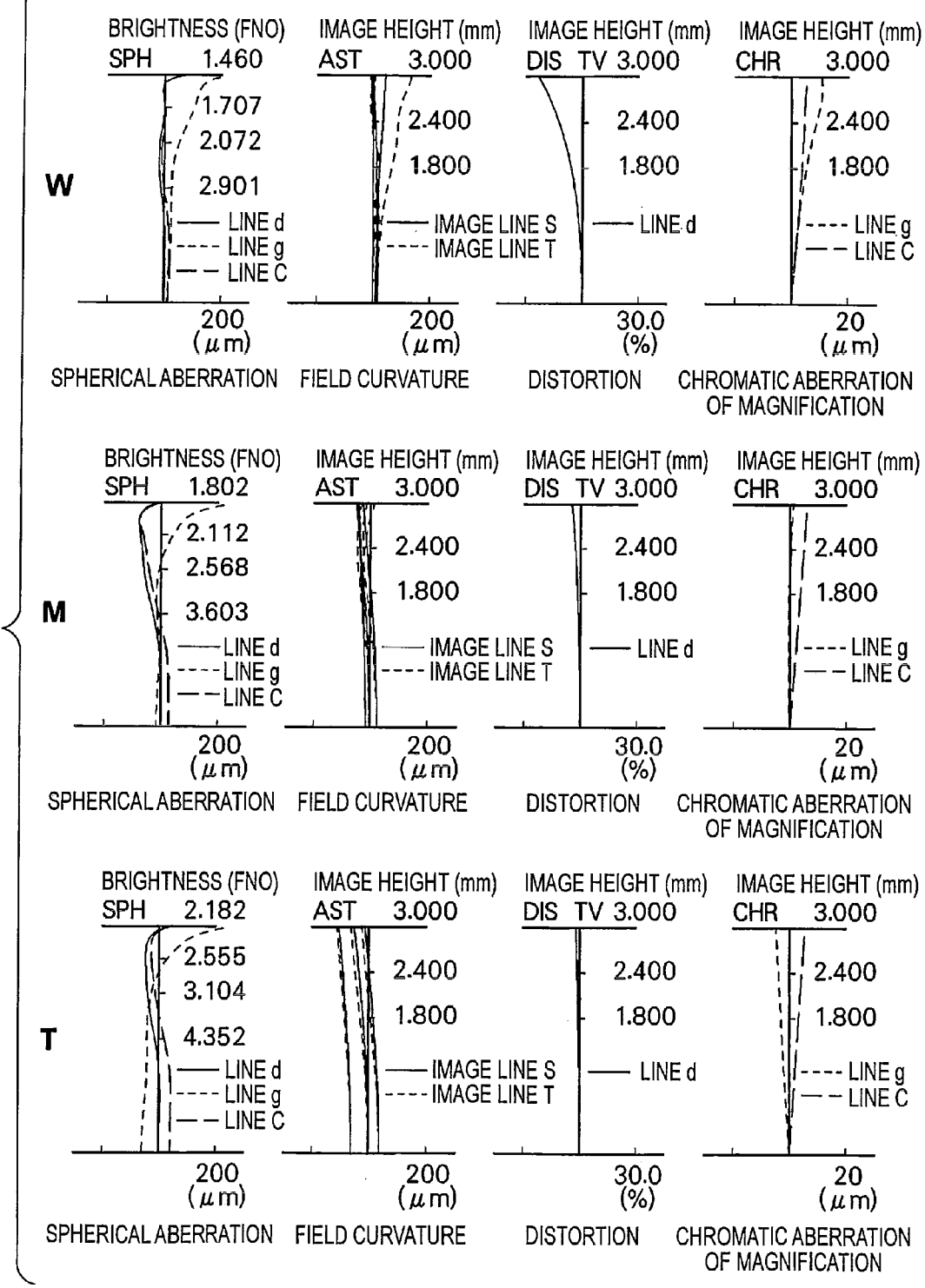
FIG. 14 is a chart of aberrations of the imaging lens of Example 6 of the present invention.
Figure 15:
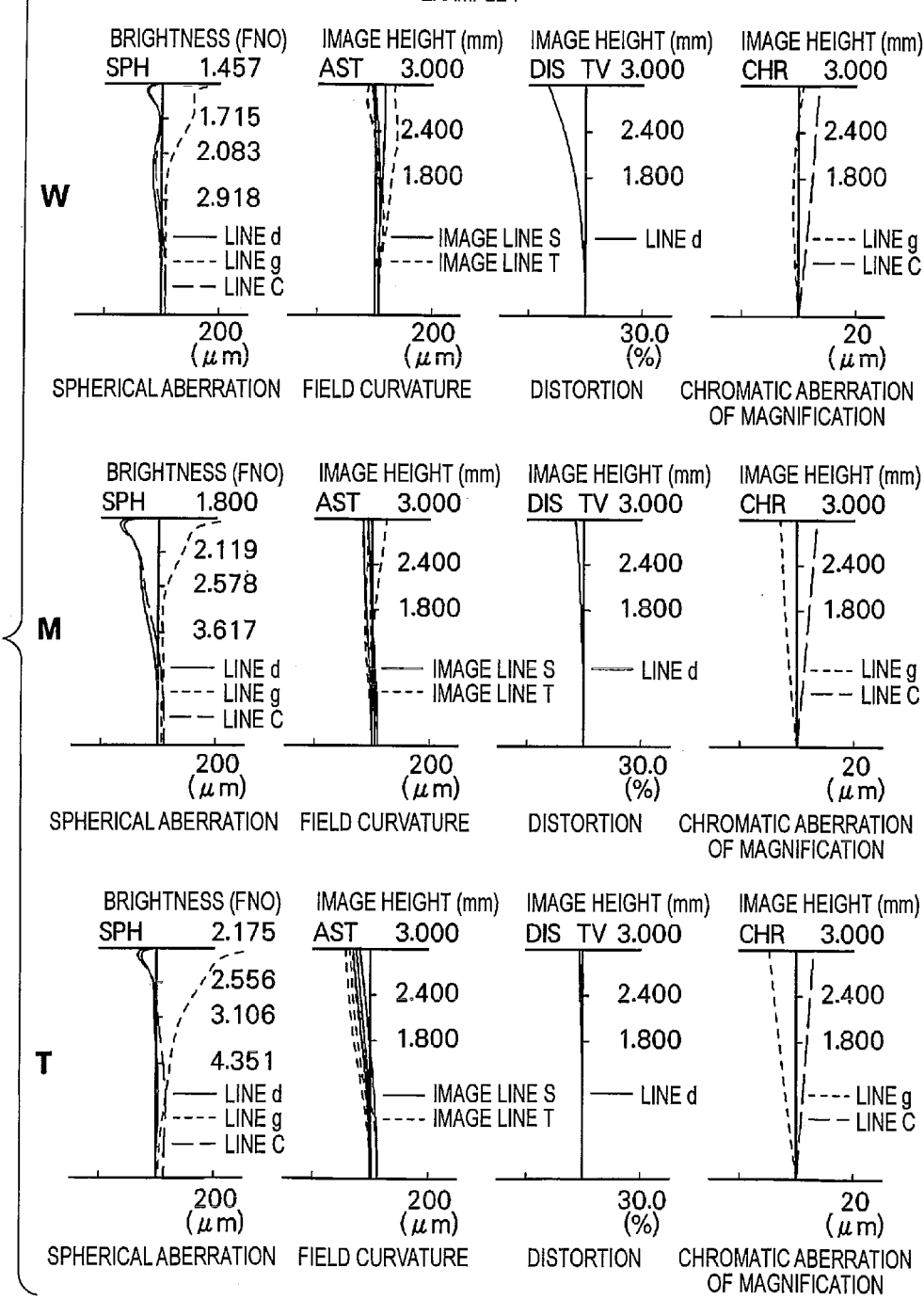
FIG. 15 is a chart of aberrations of the imaging lens of Example 7 of the present invention.
Figure 16:
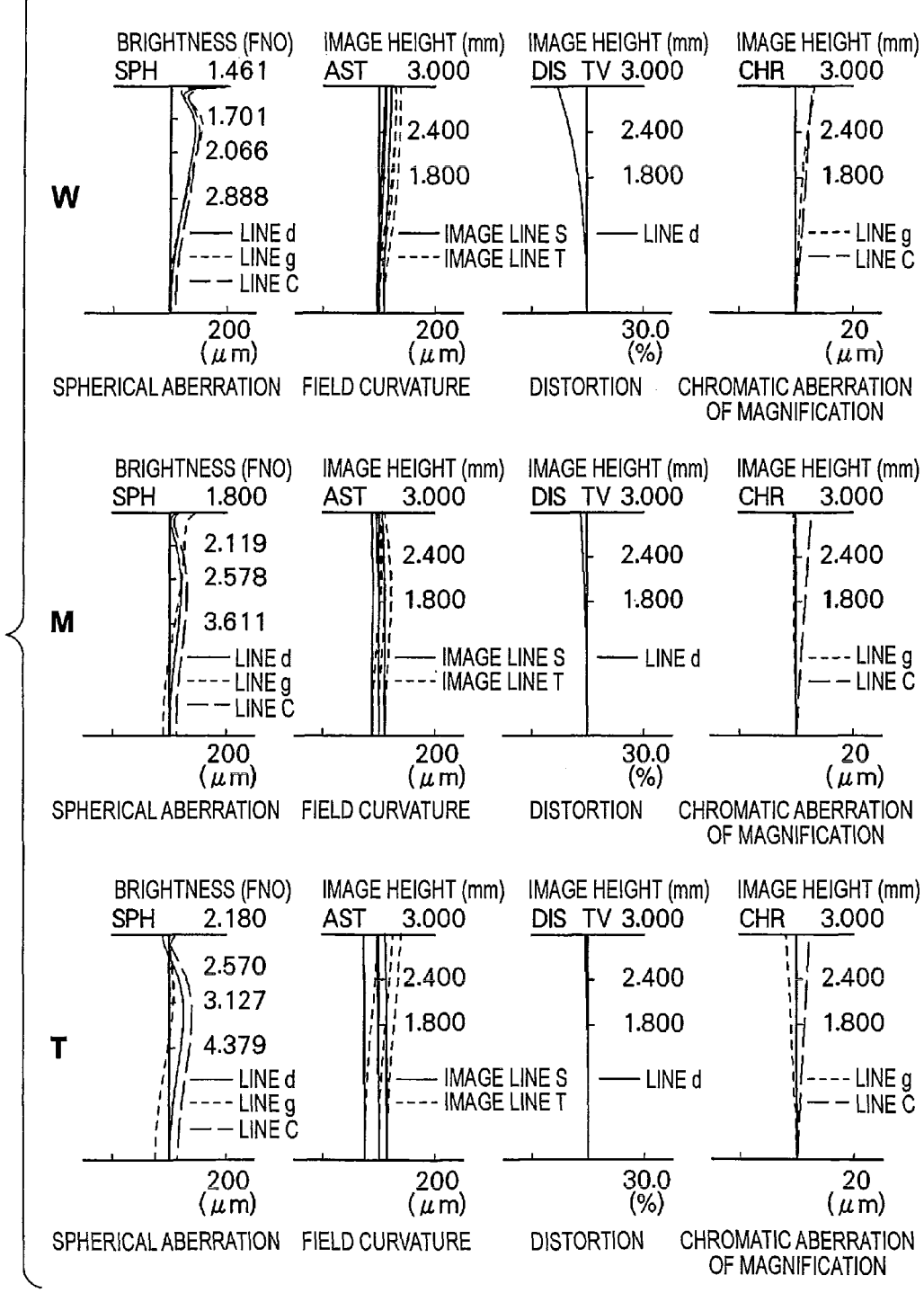
FIG. 16 is a chart of aberrations of the imaging lens of Example 8 of the present invention.

FIG. 9 shows charts of aberrations, such as a spherical aberration, an astigmatic aberration, a distortion (a distortion aberration), and a chromatic aberration of magnification that are achieved at the wide angle end, the intermediate field angle, and the telephoto end of the variable power optical system of Example 1. Each of the aberration charts shows an aberration achieved while the D line (a wavelength of 587.6 nm) is taken as a reference waveform. However, the spherical aberration chart and the chart pertaining to a chromatic aberration of magnification also provide aberrations achieved with reference to a G line (a wavelength 435.8 nm) and a C line (a wavelength of 656.3 nm).

The distortion aberration is described as TV distortion. Specifically, a degree of distortion in an object image perpendicular to an optical axis that is formed by means of an optical system of a plane object perpendicular to the optical axis is represented as a distortion aberration. In the field of a photographic lens, and the like, a numeral determined by dividing a difference between an ideal image height and an actual image height by the ideal image height is expressed as a percentage. In contrast, a definition expression differing from the expression is used in the field of a TV lens. Distortion determined by the definition expression is distinguished as a TV indication from the distortion of the optical field. According to the definition, the amount of curve in a long side in a TV screen is taken as an object; namely, the amount of distortion.

Specifically, a depth Δh of a curve in a long side is divided by a vertical screen length $2h$, and a result of division is expressed a percentage. The amount of distortion is represented by the following expression.

$$DTV = \Delta h / 2h \times 100$$

In a distortion chart, an actual image height Y from an optical axis is taken as four points in four diagonal directions of a screen with reference to the center of the optical axis. A rectangular plane object achieved on an object side of a plane image plotted by connecting the four points is assumed. An actual image height achieved at the centers of respective long sides of the image is "h," and a difference between the actual image height and a vertical height from the diagonal points to the optical axis is taken as Δh. Accordingly, the amount of distortion varies according to an aspect ratio of a screen. The charts are based on the assumption that the amount of distortion is computed according to a 3:4 aspect ratio of a common TV screen.

Likewise, FIGS. 10 to 16 show charts of aberrations, such as a spherical aberration, an astigmatic aberration, a distortion (a distortion aberration), and a chromatic aberration of magnification that are achieved at the wide angle end, the intermediate field angle, and the telephoto end of each of the variable power optical systems of Examples 2 through 8.

Data provided above show that the variable power optical systems of Examples 1 through 8 make superior corrections to the respective aberrations and exhibit high optical performance in a visible range at both the wide angle end and the telephoto end. These variable power optical systems can preferably be used for imaging devices, such as a surveillance camera, a video camera, and an electronic still camera.

Figure 17:
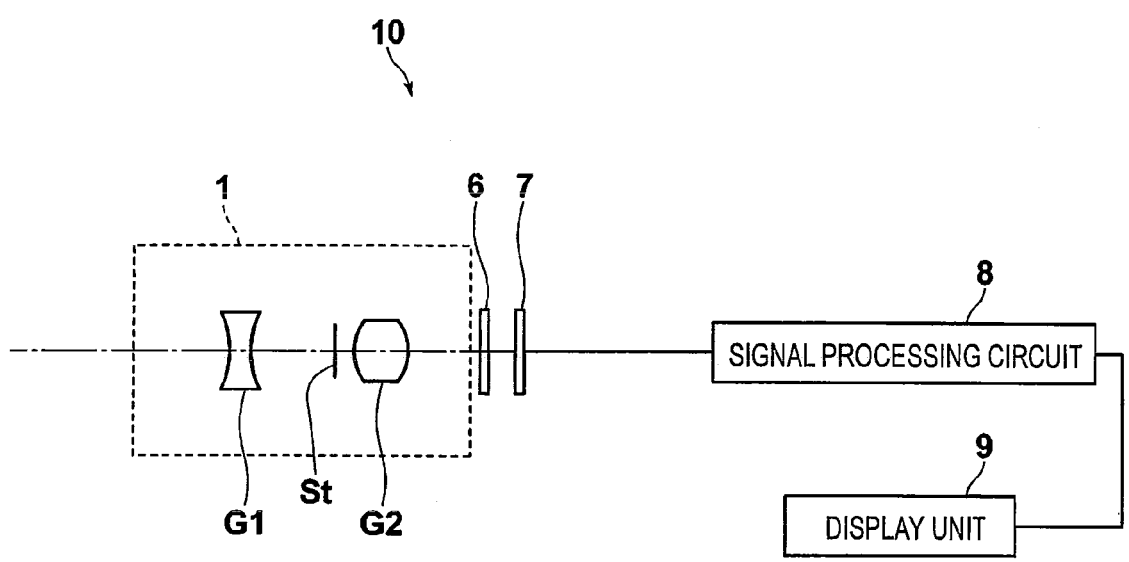
FIG. 17 is a schematic block diagram of an imaging device of an embodiment of the present invention.

FIG. 17 shows, as an example imaging device of the embodiment of the present invention, a block diagram of a video camera 10 using the variable power optical system 1 of the embodiment of the present invention. FIG. 17 schematically shows the negative first lens group G1, the aperture stop St, and the positive second lens group G2 of the variable power optical system 1.

The video camera 10 has the variable power optical system 1; a filter 6 having a feature of a low-pass filter, an infrared-ray cutoff filter, and the like, disposed on the image side of the variable power optical system 1; an imaging element 7 disposed on an image side of the filter 6; and a signal processing circuit 8. The imaging element 7 converts an optical image generated by the variable power optical system 1 into an electric signal. For instance, a CCD (Charge-coupled Device), CMOS (Complementary Metal Oxide Semiconductor), and the like, can be used for the imaging element 7. The imaging element 7 is arranged in such a way that an imaging plane of the imaging element coincides with the image plane of the variable power optical system 1.

The image captured by the variable power optical system 1 is formed on the imaging plane of the imaging element 7, and a signal pertaining to the image, which is output from the imaging element 7, is subjected to arithmetic processing in the signal processing circuit 8, whereupon an image is displayed on a display unit 9.

Although FIG. 17 illustrates a so-called single plate imaging device using one imaging element 7. However, a so-called three plate imaging device that has a color separation prism for separating light into respective colors, such as R (red), G (green), and B (blue), inserted between the variable power optical system 1 and the imaging element 7 and that uses three imaging elements corresponding to the respective colors may also be used for the imaging device of the present invention.

Since the variable power optical system of the embodiment of the present invention yields the foregoing advantages, the imaging device of the embodiment can also generate a high-precision image at a wide angle.

Although the present invention has been described by reference to the embodiment and the examples, the present invention is not limited to the embodiment and the examples and is susceptible to various modifications. For instance, values of respective lens components, such as a curvature radius, an on-axis surface spacing, a refractive index, and an Abbe number, are not limited to the numerals provided in connection with the respective numerical examples and can also assume other values.

What is claimed is:

1. A variable power optical system comprising:
a first lens group having a negative refractive power and a second lens group having a positive refractive power in order from an object side of the variable power optical system, wherein
the first lens group has, in order from the object side, a negative lens whose convex surface is oriented toward the object side, a biconcave lens, and a positive lens, at least one of which is a plastic lens;
the second lens group has, in order from the object side, a biconvex lens, a biconcave lens, and a positive lens, any two adjacent lenses of which are plastic lenses;
in a direction from a wide angle side of the variable power optical system to a telephoto side of the variable power optical system, the first lens group monotonously moves from the object side toward an image plane side of the variable power optical system and the second lens group monotonously moves from the image plane side toward the object side; and,
on condition that, when a sequence of respective plastic lenses in each of the lens groups is taken in order from the object side as the $i^{th}$, fpi represents a focal length of each of the lenses; that fw represents focal lengths of the respective lenses achieved at a wide angle end of an entire system are taken; that fw/fpi represents a ratio between a refractive power of the entire system achieved at the wide angle end and a refractive power of each of the lenses achieved at the wide angle end; that P1 represents a total of fw/fpi pertaining to the plastic lenses of the first lens group; and that P2 represents a total of fw/fpi pertaining to the plastic lenses of the second lens group, conditional expressions (1) and (2) provided below are satisfied.

$$-0.22 < P1 < -0.01 \tag{1}$$

$$-0.15 < P2 < -0.03 \tag{2}$$

2. The variable power optical system according to claim 1, wherein the first lens group includes at least one negative plastic lens; and
at least one lens of the second lens group is an aspherical lens.

3. The variable power optical system according to claim 1, wherein, on condition that fF represents a synthetic focal length of the first lens group and that fB represents a synthetic focal length of the second lens group, a conditional expression (3) provided below is satisfied.

$$-1.30 < fB/fF < -1.10 \tag{3}$$

4. The variable power optical system according to claim 1, wherein, on condition that f4 represents a focal length of the biconvex lens in the second lens group and that f6 represents a focal length of the positive lens in the second lens group, a conditional expression (4) provided below is satisfied.

$$0.90 < f6/f4 < 1.20 \tag{4}$$

5. An imaging device comprising:
a variable power optical system according to claim 1; and
an imaging element that captures an image of a subject formed by the variable power optical system.

* * * * *